(12) United States Patent
Schwarte

(10) Patent No.: US 7,053,357 B2
(45) Date of Patent: *May 30, 2006

(54) METHOD AND APPARATUS FOR DETERMINING THE PHASE AND/OR AMPLITUDE INFORMATION OF AN ELECTROMAGNETIC WAVE FOR PHOTOMIXING

(76) Inventor: Rudolf Schwarte, Kreuztaler Str. 58, D-57250 Netphen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,582

(22) Filed: Nov. 29, 2004

(65) Prior Publication Data

US 2005/0092897 A1    May 5, 2005

Related U.S. Application Data

(63) Continuation of application No. 09/254,333, filed as application No. PCT/DE97/01956 on Sep. 5, 1997, now Pat. No. 6,825,455.

(30) Foreign Application Priority Data

Sep. 5, 1996  (DE) ................................. 198 36 832
Feb. 7, 1997  (DE) ................................. 197 04 486

(51) Int. Cl.
*H01L 31/00* (2006.01)

(52) U.S. Cl. .................................. 250/214.1; 257/290

(58) Field of Classification Search ................. 250/214; 257/290

See application file for complete search history.

(56) References Cited

U.S. PATENT DOCUMENTS 4,873,561 A    10/1989  Wen
5,155,383 A    10/1992  Steinbichler
5,381,235 A    1/1995   Inoue et al.
5,517,043 A    5/1996   Ma et al.
5,646,733 A    7/1997   Bieman
6,825,455 B1 * 11/2004  Schwarte ................. 250/214.1

FOREIGN PATENT DOCUMENTS

DE    44 39 298 A1    6/1996
JP    08313215        11/1996

OTHER PUBLICATIONS

Spirig et al., "The Lock-In CCD Two-Dimensional Synchronous Detection of Light," IEEE Journal of Quantum Electronics, pp. 1705-1708, (Sep. 1995).

Suzuki et al., "Real-Time Two-dimensional surface profile measurement in a sinusoidal phase-modulating laser diode interferometer," Optical Engineering, pp. 2754-2758 (Aug. 1994).

* cited by examiner

*Primary Examiner*—Que T. Le
*Assistant Examiner*—Tony Lu
(74) *Attorney, Agent, or Firm*—The Maxham Firm

(57) ABSTRACT

A method and corresponding device for determining the phase and/or amplitude data of an electromagnetic wave. The method comprises the steps: beaming an electromagnetic wave onto the surface of at least one pixel having at least two light sensitive modulation gates $G_{am}$, $G_{bm}$ and associated accumulation gates $G_a$ and $G_b$, applying modulation voltages $U_{am}(t)$ and $U_{bm}(t)$ to gates $G_{am}$ and $G_{bm}$, applying a direct voltage to accumulation gates $G_a$ and $G_b$, wherein the charge carriers produced in modulation gates $G_{am}$ and $G_{bm}$ by the incident electromagnetic wave being subjected to a potential gradient due to the modulation voltages $U_{am}(t)$ and $U_{bm}(t)$, thereby drifting to the corresponding accumulation gate $G_a$ or $G_b$, and forwarding the charge carriers to evaluation electronics. A plurality of corresponding pixels can be assembled to form an array.

16 Claims, 14 Drawing Sheets

Figure 1:
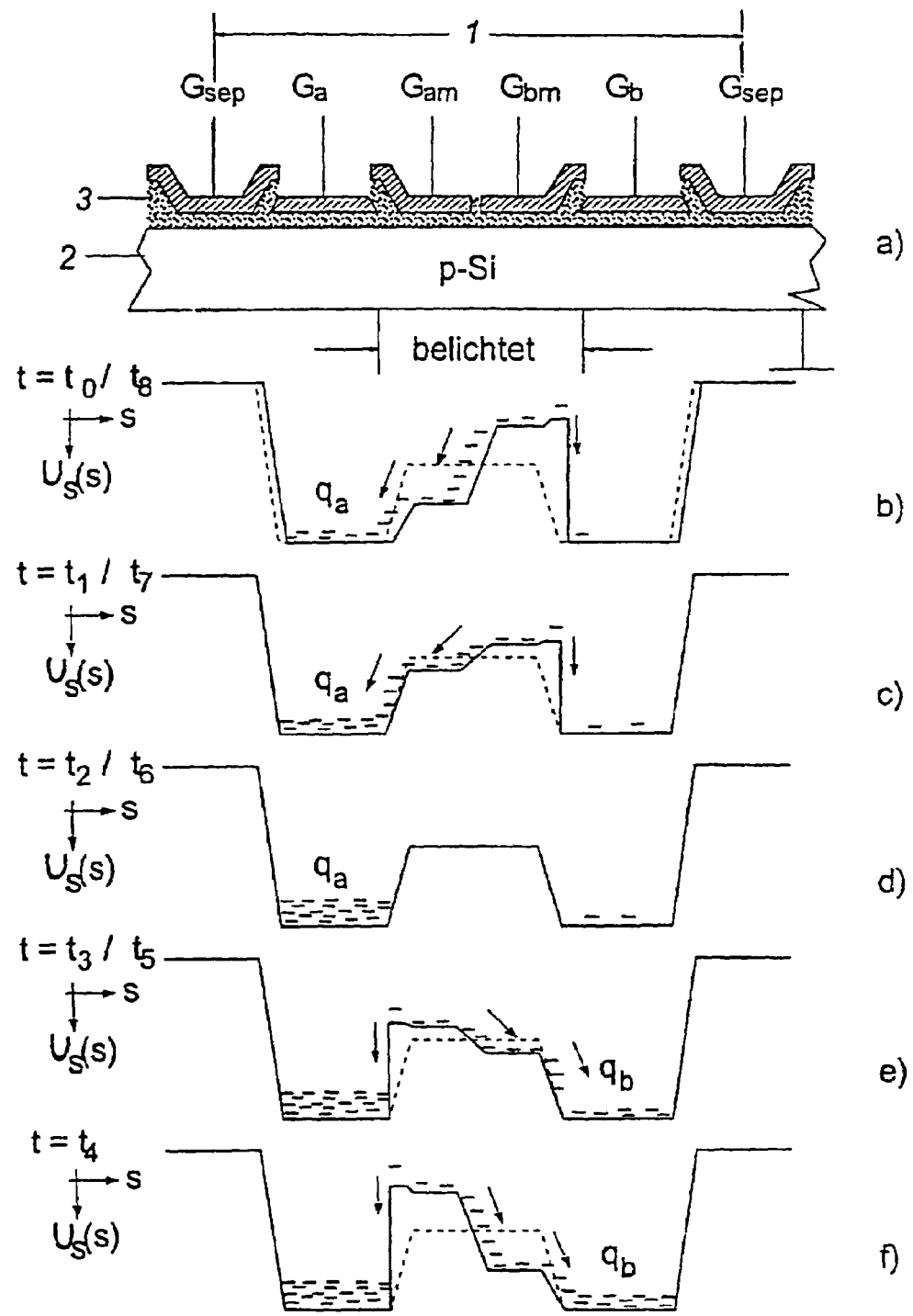

METHOD AND APPARATUS FOR DETERMINING THE PHASE AND/OR AMPLITUDE INFORMATION OF AN ELECTROMAGNETIC WAVE FOR PHOTOMIXING

CROSS-REFERENCE TO RELATED APPLICATIONS

This application is a continuation of U.S. application Ser. No. 09/254,333 filed Mar. 4, 1999 now U.S. Pat. No. 6,825,455, which was filed as a PCT international application on Sep. 5, 1997, International Ser. No. PCT/DE97/01956.

The invention concerns a method and an apparatus for determining the phase and amplitude information of an electromagnetic wave.

The term phase here generally stands for phase transit time and for the designation transit time which is also used according to the respective signal shape involved.

Hereinafter reference is made to a light wave instead of an electromagnetic wave. That however does not denote a restriction only to the spectral range of visible electromagnetic waves, but is only for the purposes of simplification.

For the measurement of frequency components in terms of amplitude and phase in wide-band and high-frequency signals, the electronic measuring art and communication art frequently use phase detectors which multiply or mix the unknown signal with a sine oscillation and determine the steady component which occurs in the presence of a signal component of the same frequency by integration or low-pass filtering.

That procedure produces the correlation function of the unknown signal with the mixing signal for a given, adjustable relative phase position. By altering the mixing frequency (sweep) the unknown signal can be broken down into its spectral components. Steady component, varying amplitude and phase of the unknown frequency component of the same frequency can be determined by at least three phase positions.

The investigation of corresponding optical signals which have acquired increasing significance in the measuring and communication arts is implemented nowadays inter alia by way of wide-band photodetectors as electro-optical transducers with subsequent electronic measurement value ascertainment, as previously described for electrical signals.

Because of the high level of expenditure involved those methods and the corresponding measurement apparatuses are usually only of a one- or two-channel nature. In the case of optical signals however very many parallel channels—in particular entire image sequences—with high frequency components frequently have to be surveyed simultaneously.

Besides the spectral modulation properties of two-dimensional light waves, an aspect of increasing interest is the rapid run of the envelope in space and time. In addition there is a wish to provide for rapidly and accurately surveying 3D-objects, for example by way of optical radar processes, which requires very fast detectors in the sub-nanosecond range, as a result of the light speed of the echo signals. At the same time they should be available as a detector array if there is desire to avoid the time-consuming operation of scanning the actively or passively bright 3D-objects.

Such a 3D-camera is proposed in DE 44 39 298 A1 which the present invention takes as its basic starting point.

Figure 10:
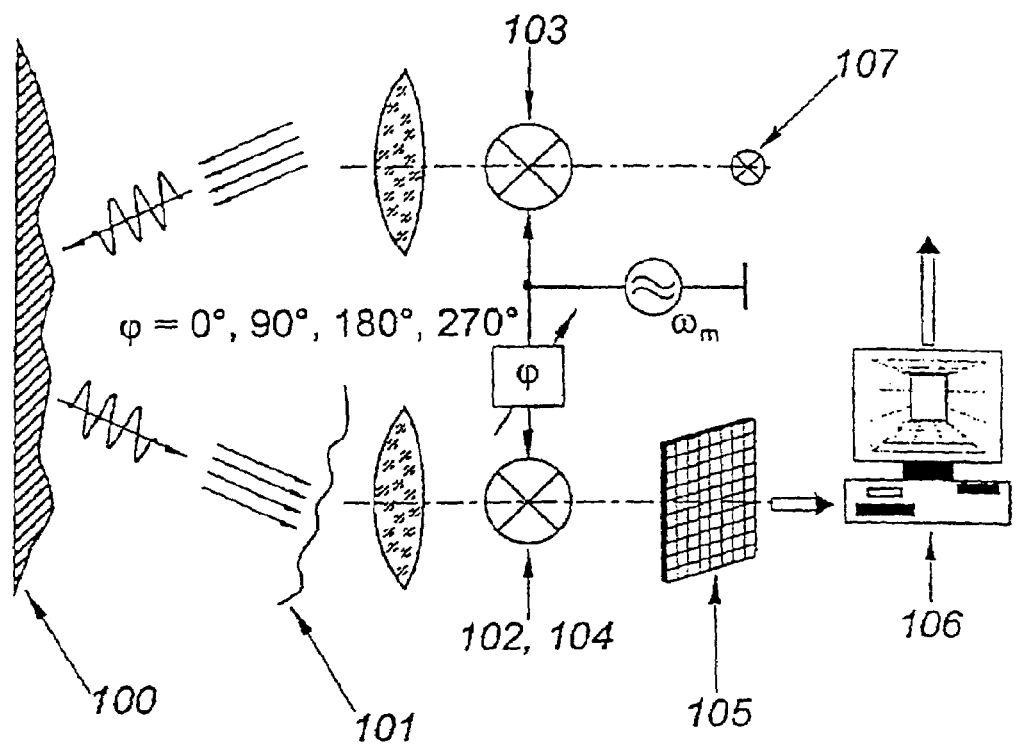

FIG. 10 is intended to illustrate that 3D-camera which is based on the echo transit time or phase transit time process. The HF-modulated light wave 101 which is irradiated by a modulated light transmitter 107 and 103 and reflected by the 3D-object 100 contains all the depth information in the delay in respect of the phase front. If the incident light wave is modulated once again in the reception aperture 102 with a two-dimensional, optical mixer 104 of the same frequency, which corresponds to a homodyne mixing or demodulation process, the result is a steady high-frequency interferogram.

That HF-interferogram can be recorded with a conventional CCD-camera 105 and subjected to further processing with an image processing arrangement 106. Integration of the steady component of the mixed product in the CCD-photoelectric charge corresponds to the formation of the correlation function of the two mixing signals. The distance-related phase delays due to the echo transit times and the amplitudes can be calculated pixel-wise from three or more interferograms by virtue of different phases of the demodulating mixing frequency, for example 0°, 120° and 240° or 0°, 90°, 180° and 270°, and thus the 3D-depth image can be reconstructed.

The two-dimensional optical mixer 103 or 104 which is also referred to as a spatial light modulator or SLM comprises in that case for example a Pockel cell which has a series of serious disadvantages which are described in the literature.

Further implementation options are afforded by LCD-windows which are admittedly inexpensive but which are about a factor of 1000 too low in terms of the desired band width.

The use of a so-called microchannel plate, as is used in image amplifiers, is also expensive and costly. The gain can be modulated by modulation of the acceleration voltage which is applied to the microchannels and which influences the secondary electron emission in the microchannels.

Furthermore, the state of the art sets out a proposal for a 2D-correlator based on a CCD-photodetector array: "The Lock-In CCD-Two-Dimensional Synchronous Detection of Light" by Spirig, Seitz et. al., published in IEEE Journal of Quantum Electronics, Vol. 31, No. 9, September 1995, pages 1705–1708. There, a photopixel is interrogated by way of four transfer gates in order to ascertain the phase of sine-modulated light. For each sine period, a respective equidistant sample is taken with the four transfer gates, whereby the phase can be easily calculated. That procedure is too slow for the indicated problems as the harmonic light signal is firstly integrated on during a scanning duration which significantly delimits the band width. It is only then that the desired mixing process is implemented with the stored charge being taken over as the scanning sample.

The object of the present invention is therefore that of providing a method and an apparatus for determining the phase and/or amplitude information and thus the envelope of a light wave, which permit a simpler, wider-band and less expensive correlator concept and rapid 3D-object surveying by way of a predeterminable lighting.

The above-indicated object is now attained by the method as set forth in claim 1 and by the photonic mixing element as set forth in claim 14, by the mixing element arrangement set forth in claim 20 and by the apparatus set forth in claim 23.

The principle according to the invention is based on a drift produced by the modulation photogate voltage and separation of the minority charge carriers photo-generated by the light wave in the material beneath at least two adjacent light-sensitive modulation photogates. In this case those charge carriers drift under the influence of the modulation photogate voltages $U_{am}(t)$ and $U_{bm}(t)$ applied to the modulation photogates, depending on the respective polarity or phase involved, to the accumulation gates which are biased with preferably double the dc voltage $U_a$ and $U_b$. The modulation photogate voltages $U_{am}(t)$ and $U_{bm}(t)$ are preferably complementarily applied and are preferably composed of a bias voltage $U_0$ and the modulation voltage $+U_m(t)$ and $-U_m(t)$ respectively superimposed in push-pull relationship. The two modulation photogates together preferably form a square surface. A pixel with only two modulation photogates can also be referred to as a dual pixel.

This principle according to the invention presupposes the photoelectric quantum effect, caused by electromagnetic waves. Nonetheless, reference will always be made to light waves, without this being interpreted as a limitation.

The actual mixing or multiplication process lies in the modulation voltage-dependent or phase-dependent drift of the photo-generated charge carriers to the right or to the left side of the modulation photogate ("charge swing"). In that respect the charge difference between the charge carriers which are separated in that way and collected under the accumulation gates and transmitted to the electronic reading-out system, having regard to integration in a predetermined time, represents a measurement in respect of the correlation function of the envelope of the incident modulated light signal and the modulation voltage $U_m(t)$.

At the same time the charge sum of those charge carriers which have drifted to the accumulation gates and passed on remains uninfluenced by the position of the charge swing and is available as suitable pixel intensity or as pixel grey value.

In order to determine the relative phase or time delay of the incident light wave, it is necessary—as described above—to implement three measurements in respect of the three parameters dc voltage component and ac voltage component and relative phase. Therefore, it is possible to involve a configuration of the pixel of the photonic mixing element with three light-sensitive modulation photogates which are acted upon by modulation photogate voltages which involve three different phase shifts relative to the light wave irradiated by the transmitter.

Desirably however to determine the phase of the reception signal at each pixel of the photonic mixing element from the resulting correlation amplitudes, use is made of four different measurements in regard to four different phases of the mixer signal. That provides for over-determination, by means of which the noise can be significantly reduced.

The push-pull arrangement of the modulation photogate voltages at two modulation photogates per pixel provides that two respective ones of those measurements are implemented at the same time. Therefore, for example in the case of HF-modulation, it is sufficient to implement two measurements which are respectively displaced through 90° at 0°/180° and also at 90°/270° phase difference in respect of the modulation photogate voltages $U_{am}(t)$ and $U_{bm}(t)$ respectively with respect to the phase of the radiated light in order to acquire the four different measurement values necessary.

A particularly preferred arrangement therefore is one in which the photonic mixing element respectively forming a pixel comprises four symmetrically arranged modulation photogates, wherein each two respective mutually oppositely disposed modulation photogates are acted upon with push-pull or 180°-phase-shifted modulation photogate voltages, wherein the two measurements which are respectively displaced through 90° and which have been described hereinbefore in connection with the dual pixel, with a 0°/180° and also 90°/270° phase difference of the modulation photogate voltages, are implemented simultaneously in this case. Such a pixel can also be referred to as a quadruple pixel.

Furthermore, for calibration of the phase shift of the modulation photogate voltages $U_{am}(t)$ and $U_{bm}(t)$ it is preferably possible for a part of the light waves irradiated by the transmitter to be directed as a reference directly onto at least one of a plurality of pixels of an arrangement of a plurality of photonic mixing elements. The phase and amplitude information obtained from that directly irradiated pixel can then be used for the calibration operation or can be employed for adjustment of the phase shift to a predetermined value.

Conversely, in the case of independently excited, unknown modulation of the incident light wave radiated by an active object, by means of at least one photonic mixing element, it is possible to measure the light wave with the known high level of resolution of a lock-in amplifier. For that purpose the photonic mixing element together with a tunable modulation generator which is in place of the transmitter forms a phase-lock loop. In addition, both in lock-in amplification the phase-lock loop is used for example for HF-modulation and also the delay-lock loop is used for digital modulation.

For surveying passive objects, modulation of the irradiated light and corresponding modulation of the modulation photogate voltages $U_{am}(t)$ and $U_{bm}(t)$ respectively can be implemented in various ways. First of all it is possible to effect continuous HF-modulation, in which case the charge differences and the charge sums are read out repeatedly at intervals which can be retroactively influenced by the pixel intensity, for evaluation of the phase and amplitude information of the light wave.

An advantageous procedure is an intermittent mode of operation with pulse-form HF-modulation and lighting, for example in order for example in each case briefly to exceed an interference background lighting. In that case only the photo-generated charges are respectively integrated during the HF-pulse and then evaluated.

In determining in particular the phase or transit time information of reflected light waves, to increase the level of phase or transit time resolution, it is possible to use the HF-pulse compression process known from the radar art, with narrow correlation functions, for example the chirp procedure. In that case, both the modulation signal of the individual photonic mixing element and also the light wave of the transmitter, which lights with a predetermined phase relationship, and thus also the light wave reflected with the phase relationship being sought, is repetitively modulated with a chirp. By virtue of chirp modulation, in a suitable manner, the insertion of an adjustable delay between the modulation photogate voltage of the photonic mixing element and the light irradiated by the transmitter provides for resolving multiple targets or suppressing troublesome multiple reflections of a lit scene.

Pseudo-noise modulation (PN-modulation) described hereinafter is available as a further form of modulation, both as base band-PN- and also HF-PN-modulation. A sampling procedure with sample-and-hold operations in the case of repetitive light signals is a special case of mixing and correlation with needle pulses. The photonic mixing element according to the invention can advantageously be used in this case also and for other uses of pulsed modulation.

The modulation modes referred to are per se all known from the state of the art.

The charges which have drifted to the accumulation gates can now be the subject of further processing in various ways.

On the one hand, the photonic mixing element can be constructed using CCD-technology, in which case the charges are collected or integrated beneath the accumulation gates and then displaced in conventional manner to the CCD-read-out circuit, for example in a three-phase shift cycle, and read out by way of p- or n-diffusion.

On the other hand, the photonic mixing element can be embodied using CMOS-technology as an active pixel element with pixel-specific electronic reading-out and signal pre-processing system. In that case, in practice the reading-out circuit which is conventional in CCD-engineering is taken at both respective sides directly to the modulation photogate. In that case the accumulation gates are preferably in the form of blocked low-capacitants pn-diodes and transmit the arriving photo-generated charges preferably directly by way of the electrodes $G_a$ and $G_b$ to the electronic pixel reading-out and signal pre-processing system for storage and processing there.

In the latter case therefore the two charge components of the charge swing are continuously read out and can be stored practically in a reaction-free manner, for example with a charge amplifier, on a respective downstream-connected capacitor.

The state of the art provides that, before each new measurement operation, the involved, charged-up capacitors are discharged by means of electronic reset switches and that desirably the fault voltages measured in the reset condition are used for correction of the actual measurement values. That use of the pixel-wise reaction-free reading-out procedure affords the advantage that the entire dynamics of the photonic mixing element and therewith the measuring method can be considerably enhanced in comparison with implementation using CCD-technology.

In a further preferred manner it is possible to directly compute the phase and amplitude information in an electronic pixel reading-out and signal pre-processing system, preferably in the form of on-chip integration. Such an application-specific opto-electronic chip (ASOC) or such an active pixel sensor (APS) enhances the measuring rate and permits pixel-wise pre-processing of the phases and/or amplitudes.

An important advantage of the present invention is that modulation is effected simultaneously with charge generation and separation. In other words, detection and mixing take place at the same time and without additional noisy and band-limiting intermediate stages. Therefore, the time drift errors which occur inter alia in the state of the art are prevented, the charge modulation and integration operations which are separated in terms of time and space from the detection operation necessarily occur and are not to be suppressed.

A further advantage of the present invention lies in the high limit frequency of the photonic mixing element. The limit frequency of charge transfer by the push-pull modulation voltage is comparable in terms of the maximum drift length or transfer distance, that is to say the sum length of the modulation photogates, with the limit frequency of corresponding MOS-transistors, and thus attains the GHz-range. In addition, troublesome common-mode signals are suppressed by virtue of anti-symmetrical charge carrier separation and difference formation. Each interference signal which does not correlate with the modulation signal, for example the background lighting, is suppressed in the charge difference, and that results in a high signal-to-noise ratio. Furthermore, there is only a slight time drift because of the combination of detection, mixing and charge carrier integration and difference formation on the same chip. In addition, a combination of practically all measurement functions becomes possible within a single semiconductor structure.

In comparison with the state of the art disclosed in DE 44 39 298 A1 with the use of Pockel cells as modulators, only low modulation voltages in the 1 instead of 1000 volt range are necessary. In addition, a 2D-arrangement of photonic mixing elements according to the invention ensures a large aperture on the receiver side.

In addition, no coherent or polarised light is required for determining the phase and/or amplitude information. Accordingly it is possible to use further specific properties of the incident light waves by the upstream arrangement of selective filters, for example in respect of polarisation and wavelength of the light. In addition, the arrangement affords a high level of sensitivity and a high signal-to-noise ratio by virtue of the elimination of the electronic mixers and wide-band photodetector amplifiers which are used in accordance with the state of the art.

The spectral optical band width of the light waves to be surveyed is determined by the spectral photosensitivity of the material used in the space charge zone under the photogates, that is to say for example in the case of silicon approximately the wavelength range of 0.3 to 1.1 µm, in the case of InGaAs about 0.8 to 1.6 µm and in the case of InSb about 1 to 5.5 µm.

The photonic mixing elements can be disposed in any zero-, one- or two-dimensional arrangement, and thus afford a wide spectrum of use geometries. In that respect, several 100,000 photonic mixing elements can be operated in parallel relationship with a modulation band width of for example 10–1000 MHz, so that for example a camera shot of a 3D-scene can be implemented extremely quickly, with determination of the distance information in each pixel. The phase image ϕ(x,y) or—in the case of modulated lighting—the distance image or depth image with the radius vector or voxel distance R(x,y) is determined in pixel-wise manner by way of the charge differences of the charges which flow to the accumulation gates and which are read out. The corresponding charge sums afford the conventional pixel grey value A(x,y). The two can be combined to give the scaled grey value image or the 3D-image A(x,y,z).

In that respect, the 3D-image repetition rate is in the range of about 10 Hz to over 1000 Hz and depends on the number of photonic mixing elements used and the level of light intensity. By means of additional colour filters, it is possible to obtain the usual colour values red (x,y) green (x,y) and blue (x,y) of the distance image R(x,y).

The integrated structure of mixing and charge carrier integration not least also provides for a simple structure in respect of the photonic mixing element. Finally, there is no need to involve particular expense in the reception channel for a conventional optical imaging system is sufficient for imaging of the incident, possibly reflected light wave, if a one- or two-dimensional scene and not just a point is to be recorded. The measuring apparatus can be flexibly adapted to different 3D-scenes by virtue of synchronous zoom of the optical transmitting and receiving system.

In the case of the method according to the invention and the corresponding mixing element or an arrangement of a plurality of mixing elements, it is desirable if the pixel phase or the pixel transit time and the pixel brightness are ascertained directly by means of an active pixel sensor structure (APS) and then read out selectively or also serially preferably by way of a multiplex structure disposed on the same chip (the so-called on-chip multiplex structure). That increases the processing speed and also reduces the number of further components required.

If moreover pixel brightness is evaluated as the sum of the charges of the associated accumulation gates, as a grey value image, a particularly preferred embodiment of the invention is one which, in the case of background lighting, that is to say in the case of non-modulated lighting which is present beside the modulated lighting, eliminates by computation the charges produced by that additional lighting at the accumulation gates, by a procedure whereby the difference is formed between the grey value images which are achieved on the one hand with modulated lighting switched on and on the other hand without the modulated lighting, that is to say after the modulated light source is switched off. No correlation information is contained in that basic brightness or that base amount of the charges at the accumulation gates so that the actual correlation information appears more clearly after subtraction of that base amount.

As already mentioned it is obviously appropriate if a plurality of the mixing elements are used either in a linear array, a surface array or a spatial array. In that respect, the term "linear" array is intended to mean not only a set of mixing elements which are arranged in a straight row in side-by-side or successive relationship but generally a set of mixing elements which are arranged along a line, wherein said line can be straight or also curved. In the case of the surface arrangements also, it is not only possible to provide planar mixing element arrangements in the form of a rectangular matrix even if that may also be preferable for practical reasons, but in principle the mixing elements can be arranged in accordance with any desired pattern and also on a curved surface, for example on the inside surface of a spherical shell. It is also possible to use arrays of the mixing elements on angled surfaces, that is to say simultaneously on two surfaces which include an angle with each other, and such arrangements are appropriate for given applications. Arrangements of that kind are embraced by the term "spatial array".

In the case of such arrays comprising a plurality of and possibly several hundred or thousand mixing elements, an advantageous and desirable configuration of the method according to the invention is one in which at least one of the pixels or mixing elements is directly irradiated with a part of the intensity-modulated electromagnetic wave serving as lighting, in which case the measurement result obtained in that way is used at said at least one pixel for calibration of the other phases and brightness results. In that respect it is desirable if such a reference pixel is acted upon by the transmitter with selectively different levels of intensity or, for the situation where a plurality of reference pixels are used, each of those pixels is acted upon by a different level of intensity. That makes it possible to avoid errors which can possibly occur by virtue of the large dynamic scope of the measurement signals.

In the case of a one- or multi-dimensional mixing element arrangement of the above-indicated kind it is desirable if the pixels are constructed using MOS-technology on a silicon substrate and can be read out with a multiplex structure, preferably with a CCD-structure.

It will be appreciated that the mixing elements according to the invention are readily suitable for use in a digital photographic camera or video camera. For that purpose, it is only necessary to provide a suitable mixing element arrangement (for example in the form of a rectangular matrix) with integrated receiving optics, electronic evaluation system and signal processing for the difference signals, the sum signals and the associated reference signals, together with a digital memory for the grey value image computed therefrom, and the transit time or distance image. The arrangement also includes a suitable transmitter or a suitable light source which radiates a three-dimensional scene with modulated electromagnetic waves or modulated light, and transmitting optics which are suitably adjustable to the receiving optics, wherein all of those components are combined together to constitute a compact unit as a digital camera. In that respect the difference between a digital photographic camera and a digital video camera is essentially only that, in a corresponding video camera, a relatively large number of images has to be recorded and stored in correspondingly short intervals of time so that suitable devices must be provided for the storage and reproduction of corresponding image sequences.

It will be appreciated that in addition in all uses lighting or illuminating a scene can be implemented with modulated light from various spectral regions, so that the colour components or chromatic components of the images, which are obtained in that way, can be used to acquire and reconstruct complete colour images with the spatial depth information which is supplied at the same time.

For a higher band width and for example also for improved edge detection, it may be desirable to use a microlens optical system in which associated with each mixing element or pixel is a microlens optical system which reduces the incident light to the central region of the pixel so that deviations from the ideal potential configuration at the modulation gates which occur in particular in the edge regions of the photosensitive surfaces are practically removed. In addition, out-of-focus imaging, which is produced by means of the microlens optical system, in the detector plane of the mixing elements, can ensure that the imaging of edges, the imaging of which extends randomly in the centre between the two pixel halves, does not result in the generation of difference charges at the accumulation gates, which simulate a correlation or false depth information.

Arrays with the photomixing elements according to the invention are also highly suitable for detecting and possibly also tracking predetermined one-, two- or three-dimensional structures in the field of view of the arrangement in question and with consideration additionally being given to the depth information or the object distance of the object which is being sought and which is possibly to be tracked.

In specific terms, selectively determining the amplitudes and the displacement of the X-, Y- and the time coordinate T of the modulation signals by ($\Delta X$, $\Delta Y$, $\Delta T$) (wherein X and Y define two linearly independent coordinates which extend on the plane of a mixing element matrix and time T means the transit time delay of the modulation signals) provides for the implementation of a three-dimensional correlation, whereby a predetermined three-dimensional object is sought in space, detected and possibly tracked.

The photomixing element according to the invention additionally also has a wide area of application in the field of optical data transmission. In that respect the photomixing element according to the invention is simply used instead of a photodiode in a conventional optical signal receiver, possibly inclusive of signal regeneration, wherein the shape of the modulation signal is adapted in the optimum manner to the signal shape and the phase of the modulation signal is also adapted in optimum manner in a phase-lock loop to the phase position of the reception signal. In other words, the clock is obtained from the signal itself and used for optimum weighting of the reception signal, whereby the signal is separated in optimum fashion from the troublesome, noisy background. In that way, sensitivity and accuracy in respect of optical data transmission can be considerably improved in comparison with conventional photodiodes. This could in particular also permit a considerable increase in the length of the optical transmission sections without intermediate amplification and a higher number of parallel communication channels in a time, frequency and code multiplex mode.

Finally, the photomixing element according to the invention can also be used for example in optically-based position detection systems, wherein the mode of operation is in principle similar to that involved in the known GPS-system which permits very accurate determination of position by means of satellite transmitters which permit the encoded radiation of signals. In a corresponding optical position detection system the satellite transmitter which is known from the GPS-system would be replaced by a widely dispersive, modulated light source which is arranged correspondingly closer to the object whose position is to be determined, for example by means of laser diodes and an optical dispersion or scatter system, while the receiver is formed by one or more photomixing elements on the object, preferably by a plurality of photomixing elements which are oriented in various directions in order to detect the signals from light sources stationarily arranged at various points, with different modulations. In that case the encoded modulation permits a clear association of stationary light sources and the object whose position is to be determined, as well as the associated signal transit times, by means of which the position is determined.

A further use is that of a demultiplexer for optical data transmission. Encoding in the form of special modulation and the associated correlation by means of the photomixing element permits a clear association of various channels.

A further application and use of the high level of phase sensitivity of the photomixing elements according to the invention lies in the measurement of the Sagnac effect, that is to say the transit time or phase shift of light waves in rotating reference systems. For that purpose, modulated light is coupled into an optical fibre which is preferably laid in a plurality of turns and the output of the optical fibre lights one of the photomixing elements according to the invention. The modulation gates of that mixing element are modulated with the same frequency as the coupled-in light waves so that the correlation result in the form of the charge distribution at the photomixing element supplies a measurement in respect of the current frequency or phase shift. During each revolution of the reference system in which the axis of rotation is not in the plane of the turns of the optical fibre or optical waveguide, frequency and transit time and therewith also phase position change and are automatically detected by the photomixing element. It is worth noting in that respect that, with the photomixing element, such fibre gyro compass systems based on the Sagnac effect can now be embodied by means of incoherent light, which do not give rise to any problems in regard to their long-term stability as the corresponding sources of error in accordance with the state of the art, the high-frequency amplifier downstream of the optical detector and the electronic mixer, are completely eliminated.

In addition, besides absolute directional measurement which is made possible with such a system, it is also possible to effect speed measurement of a moving object by means of the photomixing element according to the invention, for example insofar as a part of the light waves is removed in a beam splitter before being introduced into the optical waveguide and is directed onto a stationary object, in which case the light reflected by the stationary object is captured by a suitable photomixing element receiver and evaluated in the manner which has already been described on a number of occasions, here in regard to the Doppler frequency shift.

Depending on the respective meaning and significance of the additional depth information of a line or matrix image, a given number of photomixing elements can be integrated in the appropriate technology in a CCD-, CMOS- or TFA (Thin Film on ASIC)-image sensor.

Furthermore, in the use of a 3D-line or matrix camera in accordance with the invention, it may be appropriate additionally to use a conventional 2D-camera, wherein a preferably spectral allocation and feed of the active modulated illumination component to the 3D-camera, and of the other unmodulated illumination component, is preferably effected with a beam splitter.

For uses of the photomixing elements for 3D-measurement or surveying, for greater distances for which the modulated lighting is too weak, it is possible to use a combination of at least two 3D-line- or matrix cameras, in which case in accordance with the invention measurement or surveying is effected in the near region on the basis of the transit time principle and in the far region on the basis of the triangulation principle with inter alia existing background lighting.

In that case depth measurement in the near region is implemented as described hereinbefore, in this case in parallel by way of at least two cameras.

For depth measurement in the far region; the optical axes of the cameras, which are formed by way of the PMD-chip centre point, are directed onto a common point of intersection in the volume region to be measured, for example by suitable PMD-chip displacement in the horizontal and vertical directions and in respect of the PMD-chip spacings, wherein at the same time focussing of the optical systems of the cameras are set to that distance. With suitable previous adjustment the pixel brightness values then coincide in that volume region of greatest depth sharpness.

For the detection and identification of the objects in that volume region, in the event of correspondence of the pixel amplitudes, the sum image of the photomixing elements is added by a briefly applied dc modulation voltage, in respect of the difference image, associated with the set distance data and evaluated, while the non-corresponding pixel amplitudes are removed in the difference image by a modulation voltage which is set to zero, $U_{ma}=U_{mb}=0$.

In that way, by means of angle scanning, the 3D-scene is also measured and surveyed outside the range of the modulated transmitter lighting, wherein the necessary angles are attained both by suitable displacement of the PMD-chips and also by rotation of the individual stereo cameras and/or by pivotal movement of the entire arrangement.

The many possible uses of which only some are herein described in part in detail and in part only briefly indicated are also to be found in the following list setting forth further possible uses, the further description of which would go beyond the scope of the present application, in which respect the following list is also in no way exhaustive.

More specifically possible uses are meaningful and can be envisaged in the following areas:
 Digital 3D-photographic camera,
 Digital 3D-video camera,
 Danger area monitoring,
 Security engineering and "intelligent buildings",
 Occupant detection and identification in motor vehicles, "intelligent air bag",
 Electronic 3D-rearview mirror,
 Recognition of the traffic situation in road traffic,
 Autonomous vehicle navigation, Incoherent fibre gyro and Doppler speed measurement,
Control of autonomous transport vehicles,
Industrial cleaning robots,
Personal identification, authentification and checking of access authority,
Identification of objects, for example vehicles,
Production monitoring, material testing, 100% quality testing,
Electronic "3D-eye" for a robot hand, robust, small, all solid state,
Vehicle speed and distance-covered measurement, road condition detection, traffic jam,
Track free signalling, contact wire monitoring on railways,
Medical engineering, endoscopy,
CDMA-engineering for optical free-space or line communication,
Interactive 3D-communication for example in the multimedia area, and
3D-measurement of moving objects with a line of photomixing elements.

In that respect the following advantages of the photomixing elements of the present invention are to be emphasised (abbreviated hereinafter as "PMD" standing for "Photonic Mixer Device"):

1. PMD combines: detection, push-pull mixing and integration in a very small space of $1/100$–$1/1000$ mm² →electro-optical correlation.

2. 2-times/4-times-PMD: substitute for 2 or 4 expensive wide-band amplifiers with high dynamics and group transit time constancy and for 2 and 4 electronic mixers respectively.

3. The high level of electronic cross-talk sensitivity between transmitter and receiver is eliminated.

4. High level of integratability with some 100,000 parallel electro-optical modulators.

5. A PMD-3D-photographic or video camera is fully integratable, small, light, robust and flexibly adaptable by an optical zoom system for light transmitter and receiver. Measurement volumes for natural surfaces, distances of about 20 cm to 50 m with aperture angles of about 5° to 50°.

6. Extremely fast 3D-image recording in the 10 Hz–1000 Hz-range. Sensitivity and S/N-ratio correspond to present-day CCD- and CMOS-cameras.

7. The expected depth resolution is about 0.5 mm to 50 mm depending on the respective measurement time, lighting intensity, optics involved and spacing by virtue of optimum reference.

8. Maximum band width according to respective pixel size up to the GHz-range.

9. Modulation voltages in the range of less than 1 volt.

10. No coherent, polarised or narrow-band light is required and the spectral range depends on the light-sensitive material (for example in the case of InSb up to 5.5 μm).

11. Simultaneous recording of the 3D-depth image and the 2D-grey value image, by virtue of data fusion, affords optimised evaluation of the 3D-grey value image (or 3D-colour image).

12. The read-out circuit, by virtue of intensity-dependent variation in the integration time $T_i$, permits an increase in the dynamics by about 8 bits (factor 256).

Figure 2:
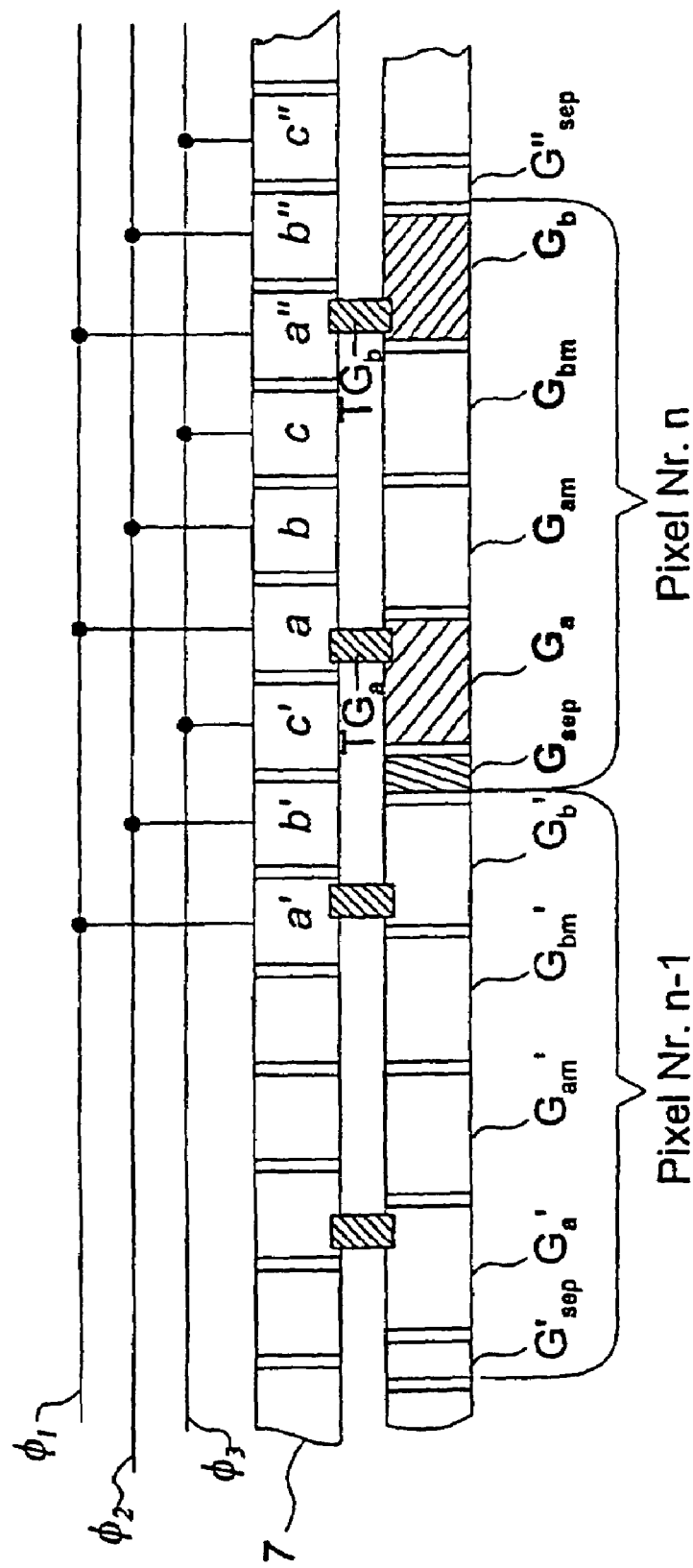
Figure 3:
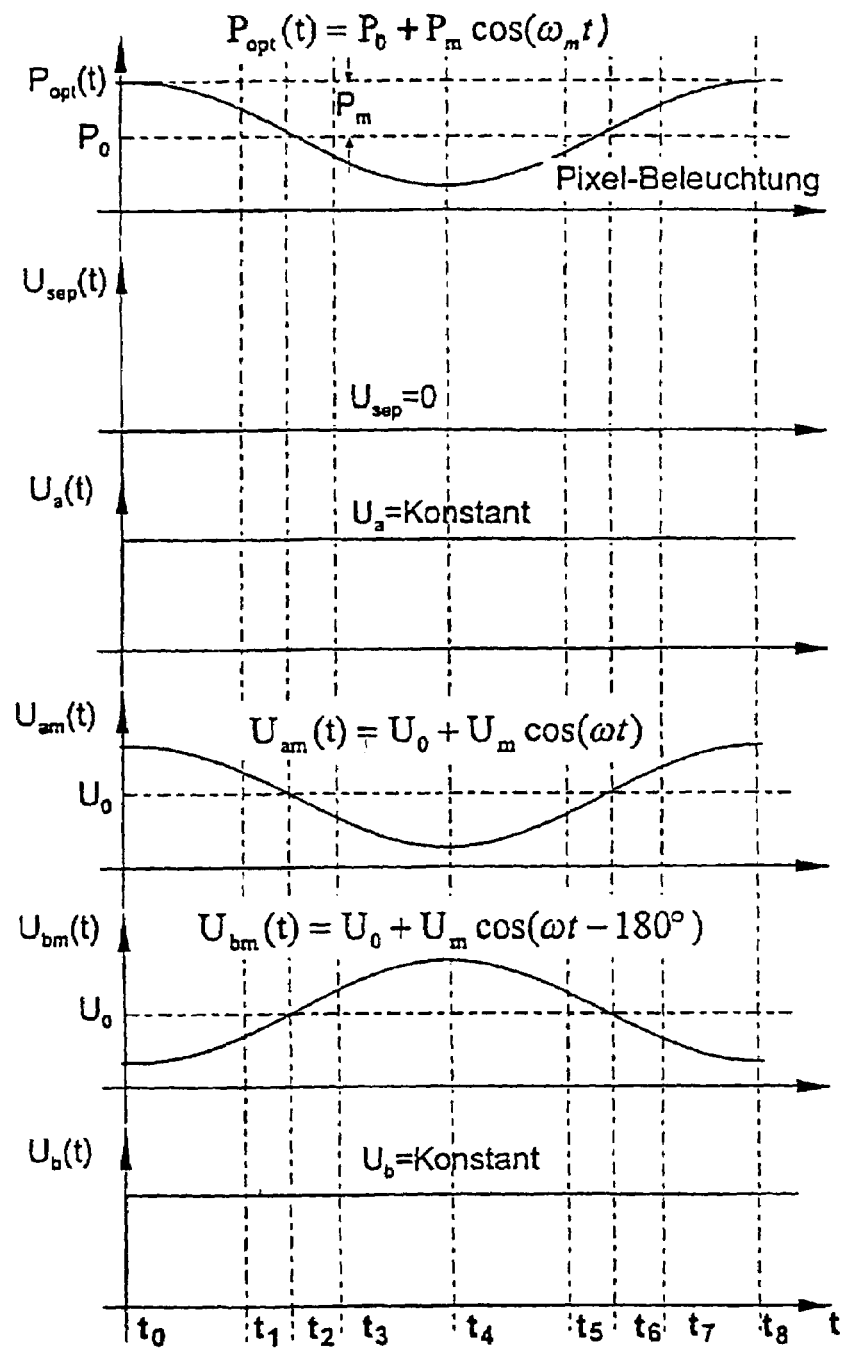
Figure 4:
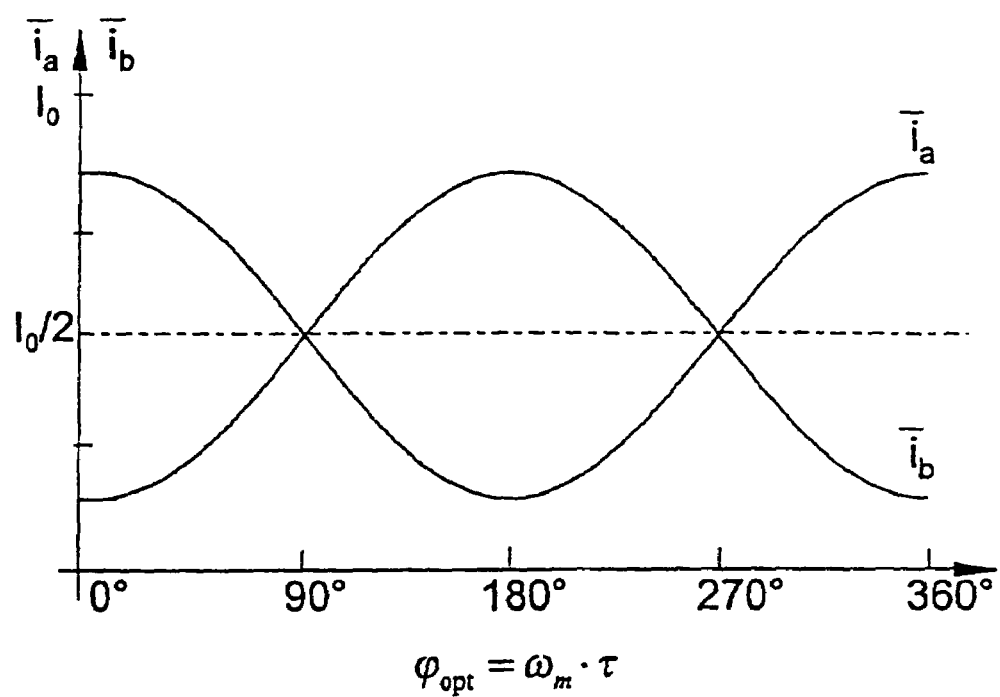
Figure 5:
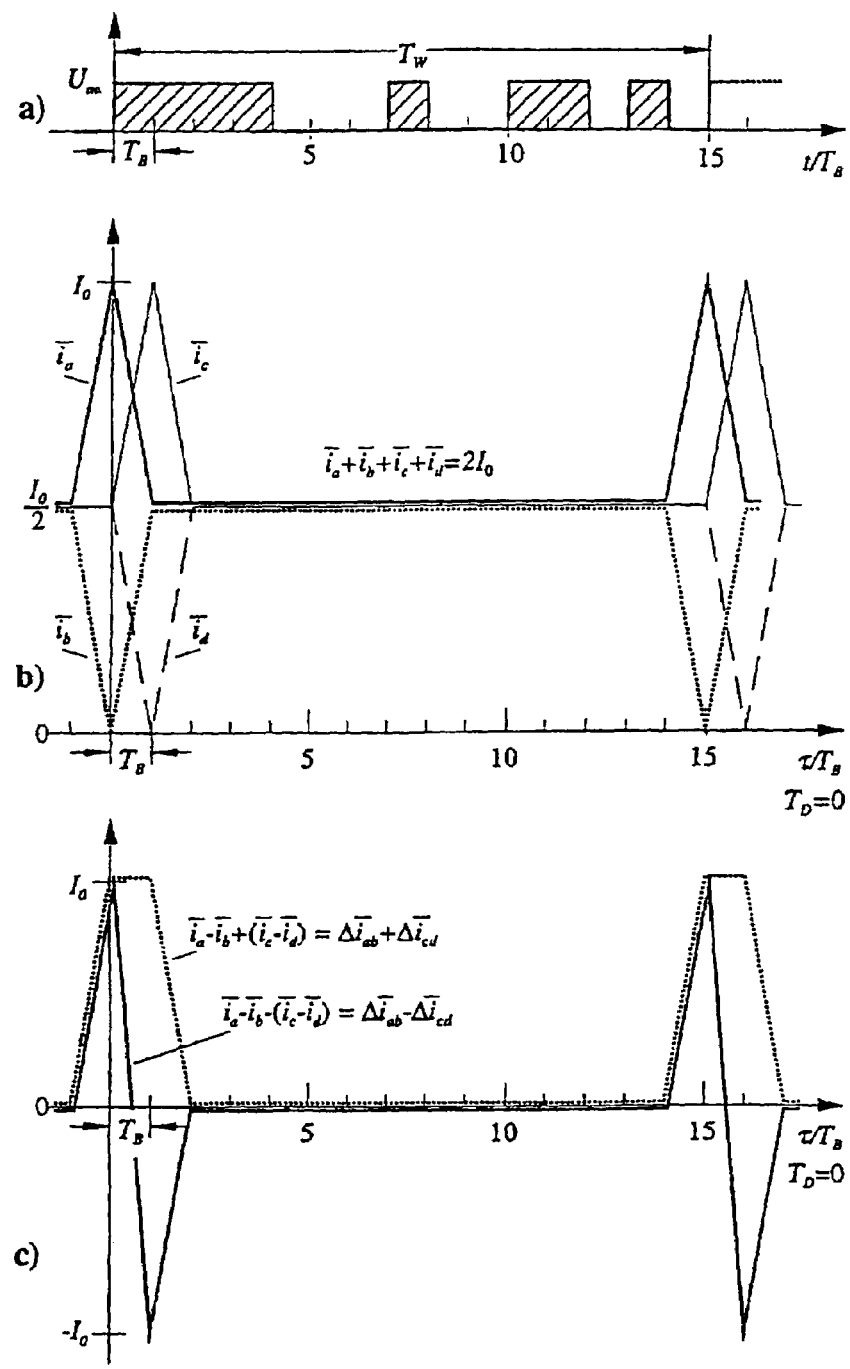
Figure 6:
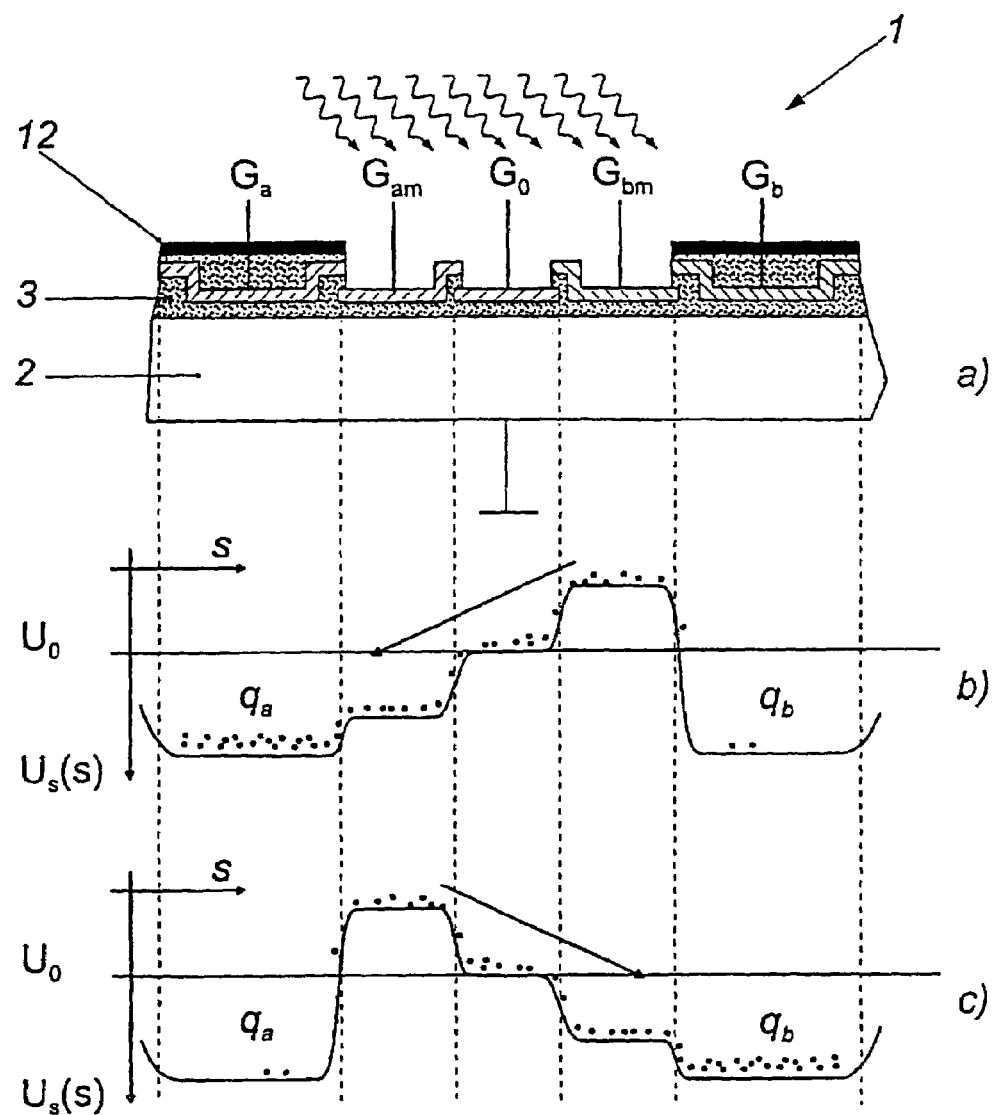
Figure 7:
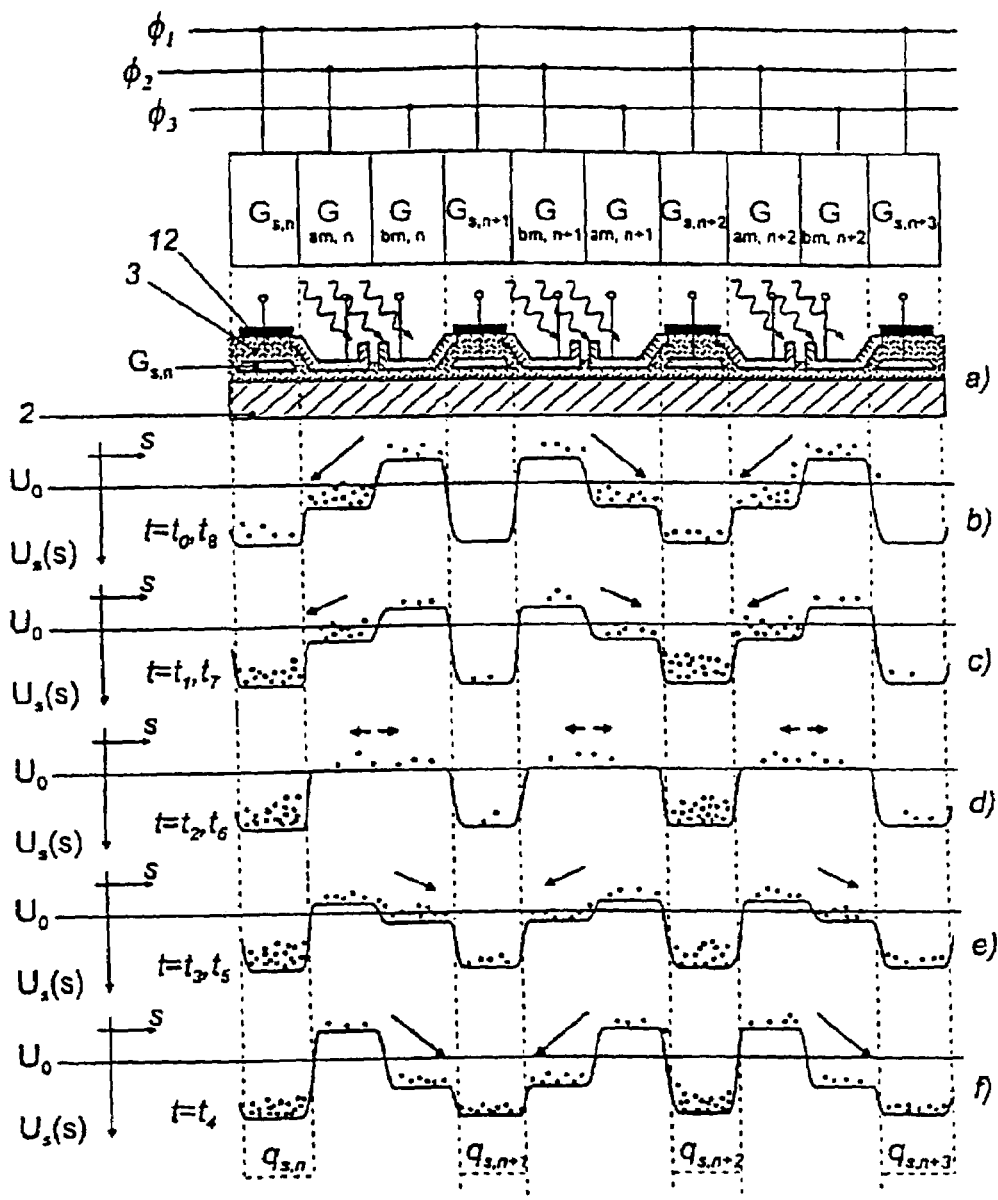
Figure 8:
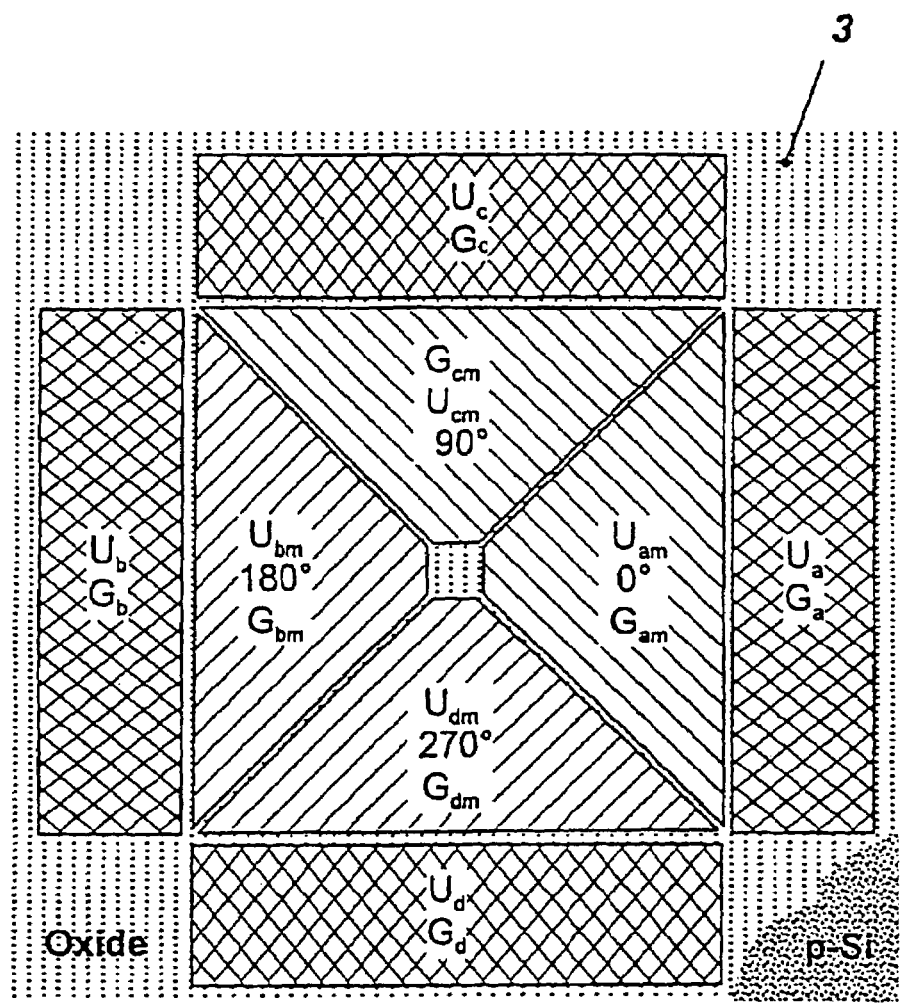
Figure 9:
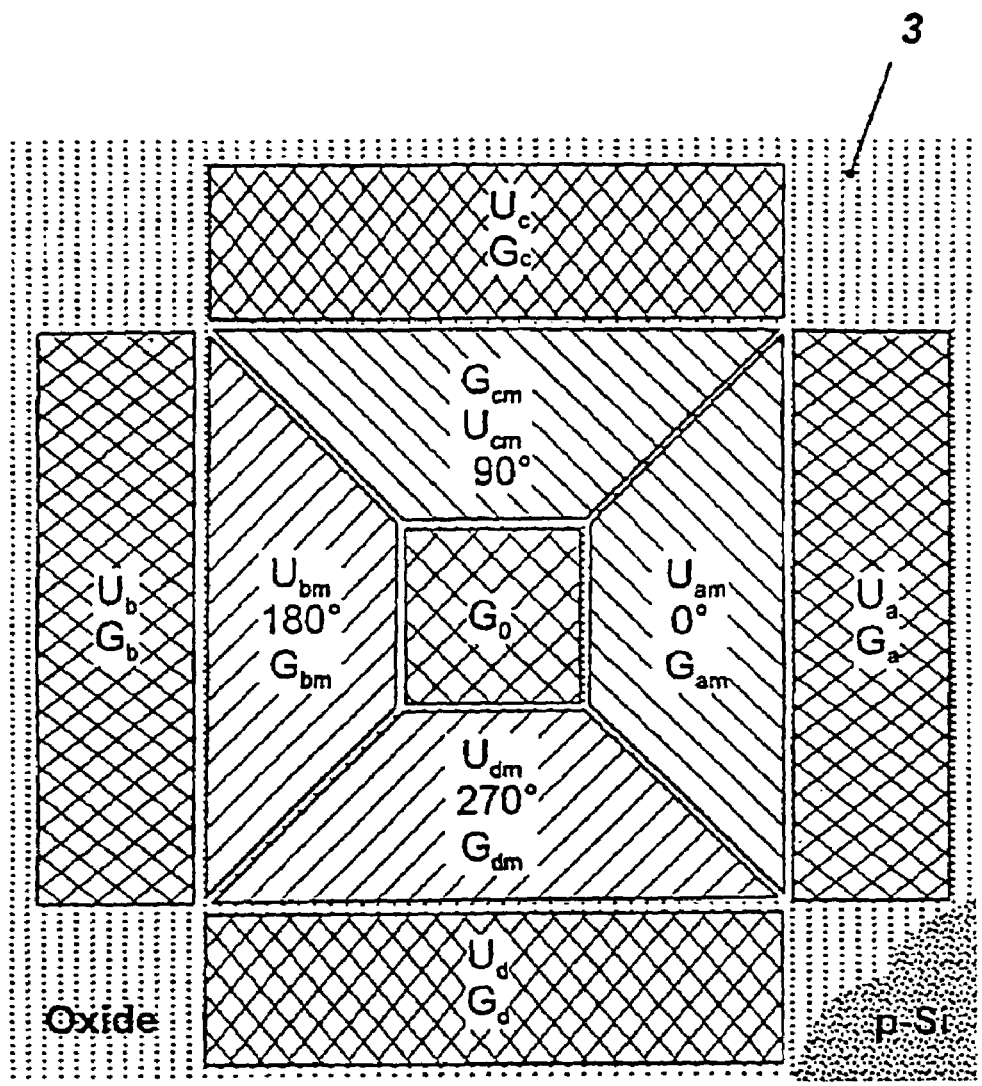
Figure 11:
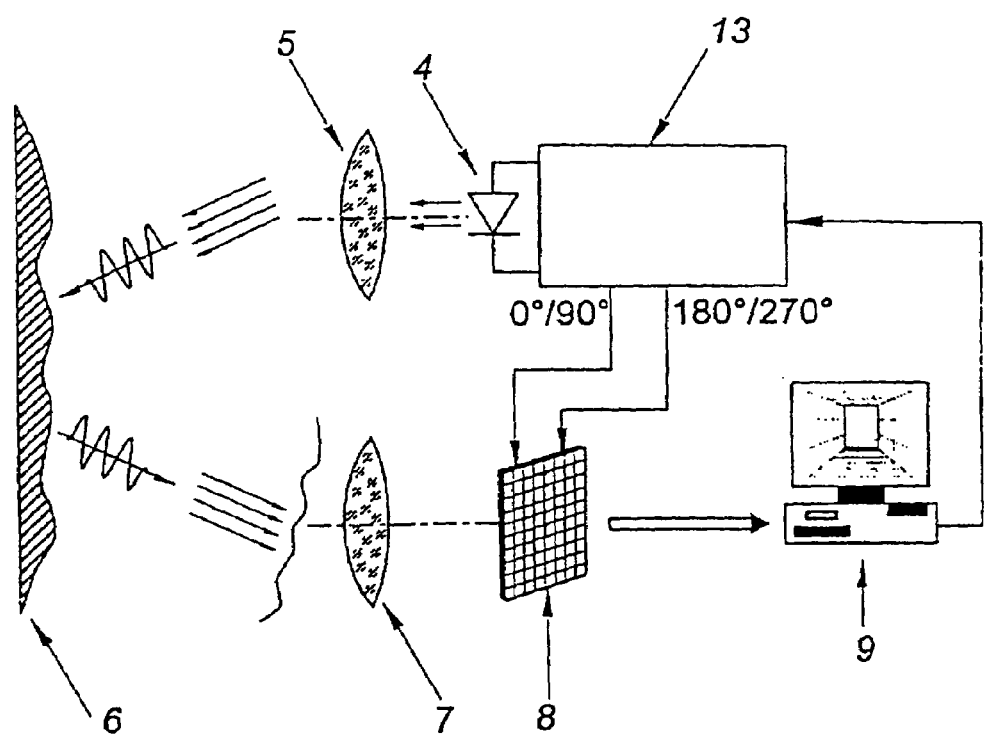
Figure 12:
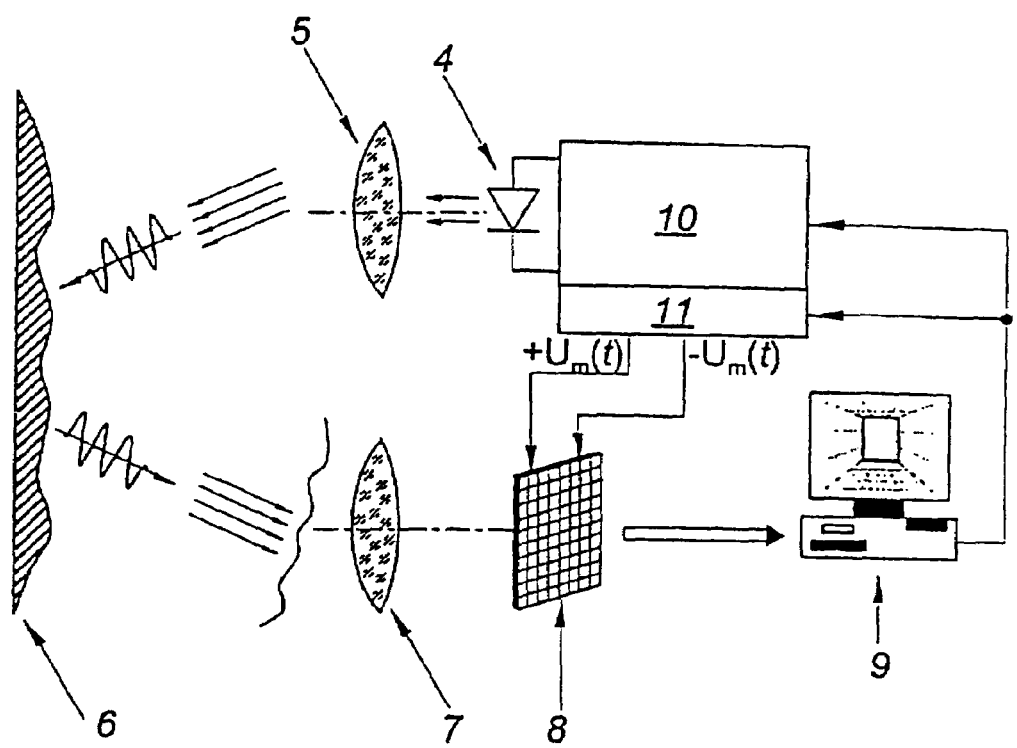
Figure 13:
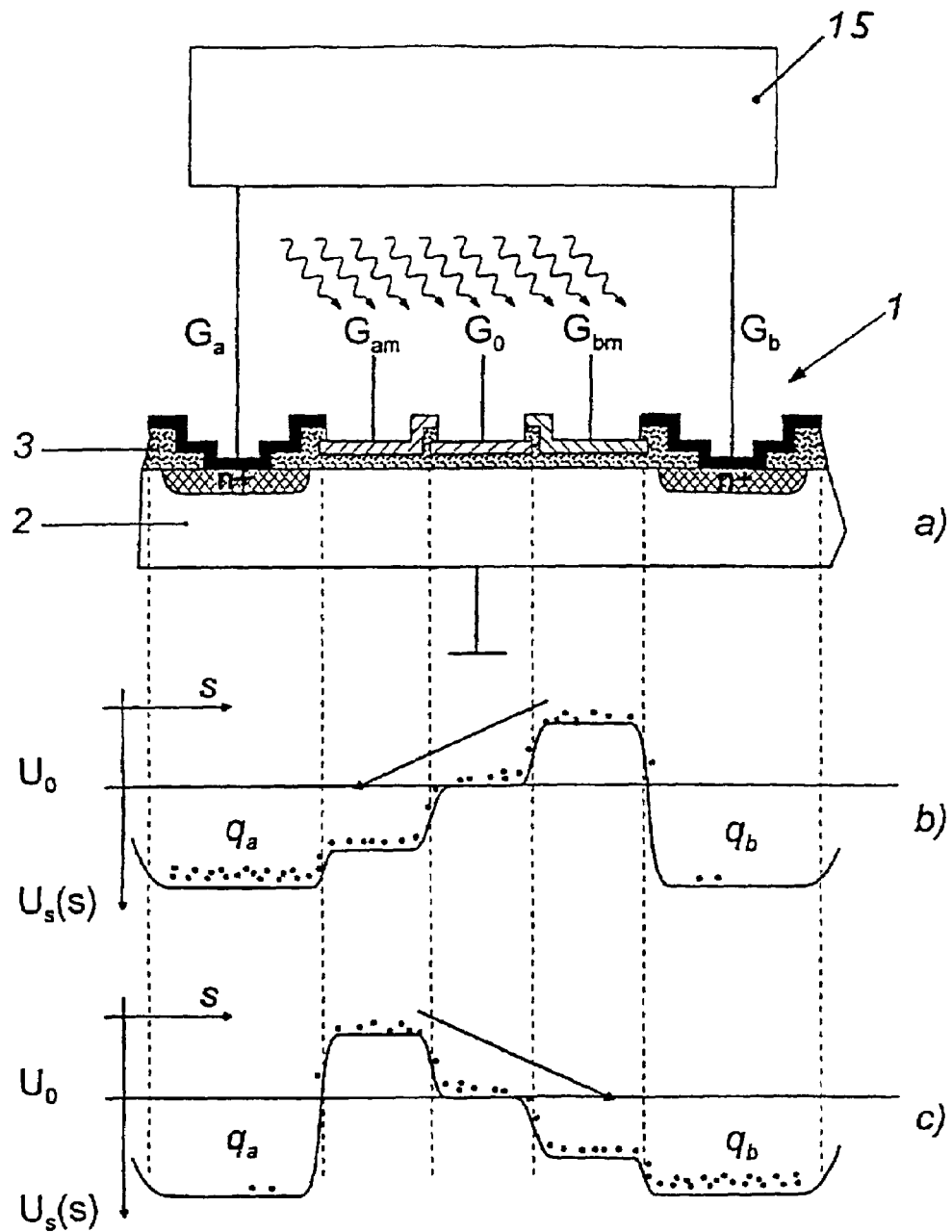
Figure 14:
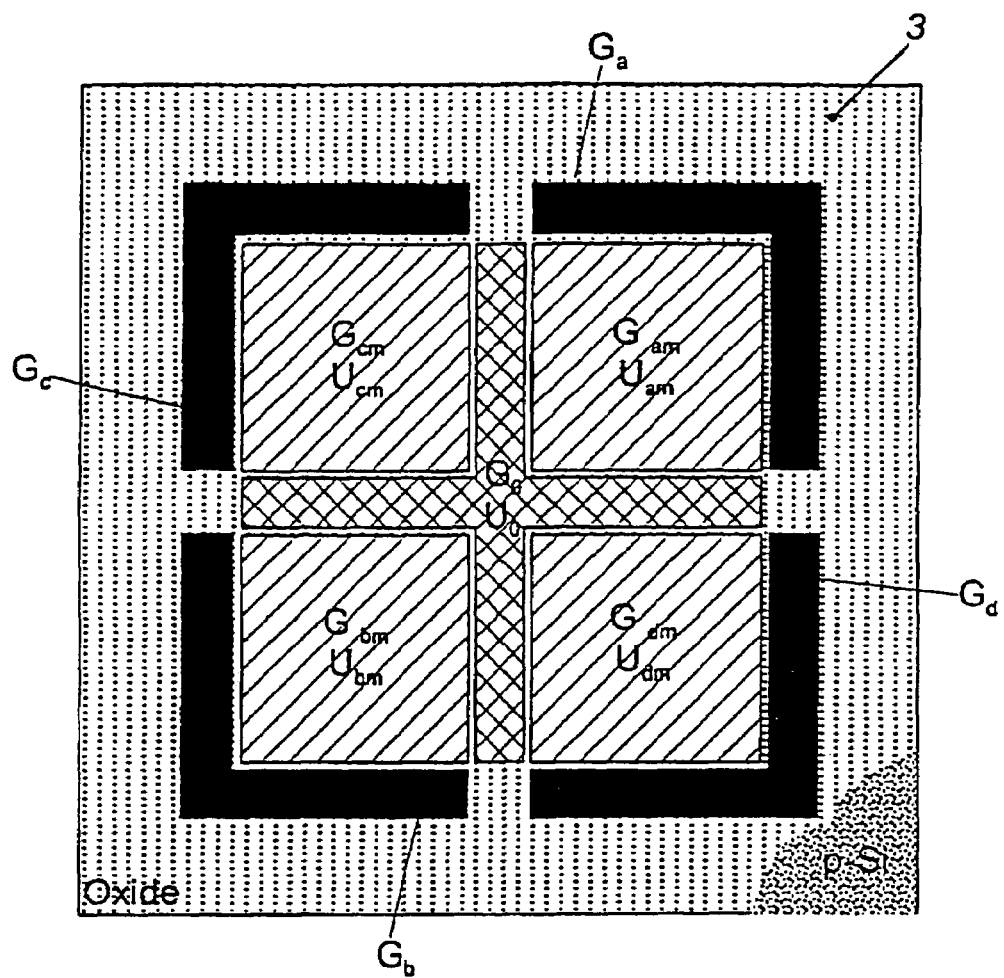

The invention will now be described in greater detail hereinafter by means of embodiments given by way of example, with reference to the drawing in which:

FIG. 1 shows in a) a view in cross-section of a pixel of a first embodiment of a photonic mixing element according to the invention using CCD-technology and in b)–f) the potential distribution $U_S(t)$ for the various phases or times of the two complementary modulation photogate voltages $U_{am}(t)$ and $U_{bm}(t)$, FIG. 2 shows a block diagram of two linearly arranged pixels using CCD-technology including a part of an interline transfer reading device, FIG. 3 is a diagram showing the intensity distribution of the incident light and the potential patterns of the voltages $U_{sep}(t)$, $U_a(t)$, $U_{am}(t)$, $U_{bm}(t)$ and $U_b(t)$ in the case of HF-modulation, FIG. 4 is a diagram showing the characteristics of the mixing and correlation result of the photonic mixing element in the form of the averaged photo-generated charge carrier currents $\bar{i}_a$ and $\bar{i}_b$ drifting to the accumulation gates in the case of HF-modulation in dependence on the relative phase or transit time shift $\phi_{opt}=\omega_m \tau$, FIG. 5 shows a diagram for PN-modulation, illustrating in a) the modulation signal, in b) the characteristics of the mixing and correlation result both for a dual pixel (only $\bar{i}_a$ and $\bar{i}_b$) and also for a quadruple pixel with $\bar{i}_c$ and $\bar{i}_d$ in the case of a delay in the modulation signal for the third and fourth modulation gates cm and dm of $T_B$ and in c) the difference values $\Delta\bar{i}_{ab}+\Delta\bar{i}_{cd}=\bar{i}_a-\bar{i}_b+(\bar{i}_c-\bar{i}_d)$ and $\Delta\bar{i}_{ab}-\Delta\bar{i}_{cd}=\bar{i}_a-\bar{i}_b-(\bar{i}_c-\bar{i}_d)$ which are relevant for distance evaluation, FIG. 6 shows in a) a view in cross-section of a pixel of a second embodiment using CCD-technology of a photonic mixing element according to the invention with a middle modulation photogate $G_0$ as well as the potential distributions under the modulation photogates and accumulation gates b) for a positive and c) for a negative modulation voltage $U_m(t)$, FIG. 7 shows in a) a view in cross-section of a pixel of a third embodiment of a photonic mixing element according to the invention and in b)–f) the potential distributions for the various phases, similarly to FIG. 1, FIG. 8 is a plan view showing a pixel of a fourth embodiment of a photonic mixing element according to the invention with four modulation photogates and four accumulation gates, referred to as a quadruple pixel, FIG. 9 is a plan view showing a pixel of a fifth embodiment of a photonic mixing element according to the invention with four modulation photogates and four accumulation gates and a central symmetrical middle gate $G_0$, FIG. 10 is a diagrammatic view of an apparatus known from the state of the art for determining the phase and amplitude information of a light wave, FIG. 11 is a diagrammatic view of an apparatus according to the invention for determining the phase and amplitude information of a light wave for HF-modulation, FIG. 12 is a diagrammatic view of an apparatus according to the invention for determining the phase and amplitude information of a light wave, for example for PN-modulation or rectangular modulation, FIG. 13 shows in a) a view in cross-section of a pixel of a sixth embodiment of a photonic mixing element according to the invention with electronic pixel read-out and pre-processing system using CMOS-technology and in b) and c) the potential distribution similarly to FIG. 6 for two phases or polarities of the modulation photogate voltage, and FIG. 14 is a plan view of a pixel of a sixth embodiment of a photonic mixing element according to the invention with four modulation photogates, four accumulation gates and a middle gate $G_0$, of a cross-shaped configuration, preferably for digital modulation.

FIG. 1*a* shows a view in cross-section of an individual pixel 1 of a photonic mixing element using the example of a CCD-structure. In that case the photonic mixing element, besides the pixel 1, includes the structures necessary for the voltage supply and the signal take-off operations. The outer gates $G_{sep}$ only serve for electrically delimiting this pixel in relation to adjacent structures.

The arrangement shown in FIG. 1 is formed on a p-doped silicon substrate 2. The mixing or multiplication operation of the proposed concept will firstly be considered for pure CW high-frequency modulation.

In relation to the cross-section FIG. 1*b–f* diagrammatically shows the potential distributions for various phases of the mixing procedure. The middle modulation photogates $G_{am}$ and $G_{bm}$ represent the light-sensitive part and are in the inversion state. In addition to a positive bias voltage $U_0$ at the conductive or optically partially transparent upper cover for example of polysilicon they are operated with the superimposed push-pull voltages $U_m(t)$. That affords the modulation voltages $U_{am}(t)=U_0+U_m(t)$ and $U_{bm}(t)=U_0-U_m(t)$ respectively.

They multiplicatively cause a separation of the minority charge carriers generated by the photons of the incident light wave in the space charge zone immediately beneath the insulating layer 3, for example of silicon oxide or silicon nitride. Those charge carriers (in the example in question being electrons) drift under the influence of the modulating push-pull voltage to the closely adjacent positive accumulation gates $G_a$ or $G_b$ and are there integrated on while the majority charge carriers or holes flow to the ground terminal of the p-Si-substrate. Rearward illumination is also possible.

FIG. 2 shows a plan view of two pixels 1 of the photonic mixing element according to the invention including a part of an interline transfer reading apparatus 7 in the form of a 3-phase CCD shift register, at one end of which is disposed the electronic reading-out system with a diffusion junction for serial processing of the charge values obtained by correlation. After a predeterminable time T for charge accumulation under all accumulation gates of the line for example at pixel No n the charges $q_a$ and $q_b$ under $G_a$ and $G_b$ are passed by way of the respective transfer gate $TG_a$ and $TG_b$ to the 3-phase read-out shift register. The delimiting separation gates $G_{sep}$ protect the correlation pixel from undesired external influences and are preferably at ground potential.

FIG. 3 shows the voltage configurations associated with FIG. 1. The modulation photogates $G_{am}$ and $G_{bm}$ are operated by means of the modulation photogate voltages shown in FIG. 3, including a phase-opposition HF-modulation voltage $U_m(t)$, which are described as follows:

$$U_{am}=U_0+U_m \cos(\omega_m t) \quad (1a)$$

and $$U_{bm}=U_0+U_m \cos(\omega_m t-180°)=U_0-U_m \cos(\omega_m t) \quad (1b)$$

FIG. 1*b–f* clearly shows the potential distribution $U_S(s)$ in the space charge zone above the spatial extent s of a representative pixel 1 for all gates in question of that pixel in the time sequence from $t_0$ to $t_8$ for the duration of a period $T_m$ of the HF-modulation signal. At the accumulation gates $G_a$ and $G_b$ a relatively high positive voltage provides for the accumulation of the photo-generated charge carriers after they have drifted either predominantly towards the left or towards the right side of the pixel 1 shown in cross-section in FIG. 1, according to the polarity of the modulation photogate voltages $U_{am}(t)$ and $U_{bm}(t)$. That operation has a particular effect when light modulation and the modulation photogate voltage $U_{am}(t)$ involve the same frequency. Then, depending on the respective phase difference $\phi_{opt}$ there is a mean preferential direction of the charge carrier drift to the accumulation gates $G_a$ and $G_b$. The associated averaged currents are described by $\bar{i}_a$ and $\bar{i}_b$.

The underlying correlation procedure can be mathematically described as follows: In the reception plane of the most general case of 2D-arrays of photonic mixing elements z=0 and the incident modulated light wave is there generally described by $P_{opt}(x,y,t-\tau)$. Here, it is described by way of the photo-generated charge carriers with the push-pull modulation signal acting there, in general form by $U_m(x,y,t)$, approximately multiplicatively and integratively linked in terms of the charge differences in respect of the two accumulation gates. The corresponding correlation function $\phi_{U_m,P_{opt}}(x,y,t)$ is described for example for all averaged differences of the charge carrier drifts $\Delta q_{ab}/T=\Delta\bar{i}_{ab}=\bar{i}_a-\bar{i}_b$ (with T=integration time) to the accumulation gates $G_a$ and $G_b$, in the most general case, in dependence on location, as the triple convolution:

$$\phi_{U_m \cdot P_{opt}}(x,y,\tau)=k_1 \cdot U_{am}(-x,-y,-\tau) * * * P_{opt}(x,y,\tau)$$
$$=k_2 \cdot \Delta\bar{i}_{ab}(x,y,\tau) \quad (2)$$

with the transit time difference $\tau=\phi_{opt}/\omega_m$, the modulation angular frequency $w_m$ and the constants $k_1$ and $k_2$ which are dependent on structure but which are unimportant in terms of the operating principle.

The photonic mixing element in accordance with the invention achieves that aim with a high level of positional and time resolution by virtue of the rapid separating charge transport of the photoelectrons and their push-pull storage and difference and sum evaluation. In that respect, by virtue of forming the difference of the averaged drift currents $\Delta\bar{i}_{ab}(t)=\bar{i}_a(t)-\bar{i}_b(t)$ which are time-dependent in the case of non-stable light waves, all troublesome offset components are suppressed and at the same time the desired correlation function in respect of the light signal $P_{opt}(t-\tau)$ with the modulation voltage $U_m(t)$ is formed.

That procedure is to be described in greater detail herein. The HF-drift field caused by way of $U_{am}(t)$ and $U_{bm}(t)$ provides that the electrons drift to the respectively positive side. During for example the positive half-wave of the modulation photogate voltage $U_{am}(t)=U_0+U_m(t)$, that is to say during the negative half-wave of $U_{bm}(t)=U_0-U_m(t)$, the photo-generated charge carriers will drift to the accumulation gate $G_a$ and are there accumulated or passed on as a charge quantity $q_a$ (see the two upper modulation photogate voltage distributions in FIGS. 1*b* and *c*). FIG. 3, for the situation of stable, harmonically modulated lighting, represents the optical power per pixel as:

$$P_{opt}(t-\tau)=P_0+P_m \cos(\omega t-\phi_{opt}) \quad (3)$$

wherein $P_0$ represents the mean value inclusive of the background lighting, $P_m$ represents the modulation amplitude, $\omega_m$ represents the HF-modulation frequency, $\phi_{opt}$ represents the phase delay and $\tau=\phi_{opt}/\omega_m$ represents the corresponding transit time delay of the incident light wave with respect to the modulation phase at $G_{am}$. The total photocurrent generated per pixel is:

$$i(t)=S_\lambda \cdot P_{opt}(t-\tau)=S_\lambda \cdot [P_0+P_m \cdot \cos(\omega_m t-\phi_{opt})] \quad (4)$$

$$i(t)=I_0+I_m \cdot \cos(\omega_m t-\phi_{opt}) \quad (5)$$

with the parameters $i(t)=i_a(t)+i_b(t)$, $I_0$=mean value of the pixel photocurrent in accordance with $P_0$, $I_m$=alternating amplitude of the modulated photocurrent in accordance with $P_m$, and $S_\lambda$=spectral sensitivity. That entire photocurrent per pixel is divided into two components, more specifically into the current $i_a(t)$ of the accumulation gate $G_a$ and into the current $i_b(t)$ of the accumulation gate $G_b$. As those values are integrated—in CCD-technology under the respective accumulation gates $G_a$ and $G_b$ and in the case of CMOS-technology which reads out in pixel-wise manner preferably in the electronic reading system—it is sufficient hereinafter for consideration to be given to the mean values $\bar{i}_a$ and $\bar{i}_b$ of those currents. The maximum in terms of charge separation is achieved for the angle $\phi_{opt}=0$ and $\tau=0$. That situation is shown in FIG. 3.

Harmonic modulation affords, under the assumption of idealised conditions such as suitable modulation amplitude, negligible drift transit times, 100% modulation depth with $P_m=P_0$ for the mean photocurrents $\bar{i}_a$ and $\bar{i}_b$ respectively:

$$\bar{i}_a = \frac{I_a}{2} + \frac{I_m}{\pi}\cos(\varphi_{opt}) \tag{6}$$

$$\bar{i}_b = \frac{I_a}{2} - \frac{I_m}{\pi}\cos(\varphi_{opt}) \tag{7}$$

FIG. 4 shows the configuration of these idealised mean pixel currents. They represent the opposite-phase correlation functions which result from the HF-modulated reception light and the HF-modulation photogate voltages applied at the modulation photogates $G_{am}$ and $G_{bm}$. The sum thereof corresponds to $I_0$ of the mean pixel light power $P_0$. The total charge quantity which is accumulated over the time $T=N*T_m$ (that is to say over N periods $T_m$ of the HF-modulation voltage) affords:

$$\bar{i}_a(\tau) \cdot T = q_{aT}(\tau) = \frac{I_0}{2} + \text{const} \cdot \int_a^T P_{opt}(t-\tau) \cdot U_m(t) \cdot dt \tag{8}$$

with a transit time $\tau=\phi_{opt}/\omega_m$ corresponding to the phase delay. Hereinafter $q_{aT}$ is only identified by $q_a$. The totality of the charges of the accumulation gates $G_a$ and $G_b$ respectively of all pixels 1 forms two locationally discrete HF-interferograms, the a-interferogram and the b-interferogram which is displaced through 180° with respect to the a-interferogram, and from them, by differencing, is formed the transit time-determined difference HF-interferogram which is being sought and which is described by equation (2).

FIG. 11 is a diagrammatic view of a 3D-camera according to the invention which uses direct mixing on the basis of an array of photonic mixing elements. Compared to the 3D-camera concept known from the state of the art, which is shown in FIG. 10, in FIG. 11 modulation of a transmitter 4 for lighting of optically passive 3D-objects is implemented by direct modulation of the current of a laser diode. In that case modulation is produced by an HF-generator 13. For larger distances, it is advantageous for example to use a high-power laser diode array with preferably common modulation current and—for the purposes of eye safety—of different wavelengths.

A first optical system 5 forms an image of the light wave on the surface of an object 6. The light wave reflected by the object 6 is then projected through a second optical system 7 onto the surface of a photonic mixing element array 8.

The photonic mixing element array 8 is also actuated by the HF-generator 13, wherein actuation is effected for different phase shifts relative to the phase of the radiated light wave by the HF-generator 13. The signals of the photonic mixing element array 8 are finally evaluated by an evaluation unit 9, if this has not already been done on-chip.

On the basis of the measuring apparatus according to the invention, no additional optical modulator with a high aperture is needed for the proposed 3D-camera concept, beside the photonic mixing element array according to the invention, and that affords a structure which is economically advantageous.

For the purposes of determining the pixel phase $\phi_{opt}$ from the resulting correlation amplitudes, use is made, as set forth hereinbefore, of a total of four different interferograms in the case of four different phases of the mixer signal. The four phases of the mixer signal arise in the situation where the modulation photogate voltages $U_{am}$ and $U_{bm}$ are switched over from the state of the phase relationship of 0°/180° to the state of 90°/270° or delayed through 90°. That gives the two associated imaginary or quadrature components in relation to the real or in-phase components, from which the pixel phase being sought can be computed, in accordance with equation (10) described hereinafter.

That mode of operation at the same time makes it possible to eliminate troublesome offset voltages which are produced by the background brightness and by the mixing operation.

Besides the measuring operation which is described by way of example in respect of CW-modulated 3D-light waves by 2D-correlation with a modulation voltage $U_m(x,y,t)$ preferably of the same frequency in the plane of the photonic mixing element array it is possible for the measuring apparatus according to the invention also to be advantageously used with modulation signals in pulse form.

In particular pseudo-noise modulation of the light is advantageous for tasks involving high-precision transit time measurement of 3D-light waves. An embodiment by way of example for surveying or measuring optically passive 3D-objects is shown in FIG. 12. Similarly to the embodiment involving harmonic modulation in FIG. 11 the apparatus according to the invention has a suitable lighting device which lights the 3D-objects 6 with light which is PN(Pseudo-Noise)-modulated in intensity and the reflected and received light is subjected to the correlation procedure with preferably the corresponding PN-modulation signal which is produced by the generator 13.

As the correlation in respect of PN-signals of that kind with increasing word length $T_W=T_B(2^N-1)$ resembles a triangular needle pulse with a half-value width equal to the bit width $T_B$, then for clear and complete measurement of the entire light volume or the entire space lit, a relative delay $T_D$ between the light-modulating PN-signal and the demodulating PN-push-pull voltage $U_m(t)$ of the same signal shape at the modulation photogates must pass at least once through the entire delay range of the maximum echo transit time continuously or stepwise in $T_B$-steps. That purpose is served by the delay member 11 which is adjustable in respect of the delay $T_D$ by the control and evaluation unit 9.

FIG. 5a shows the modulation signal $U_m(t)$, in regard to the example of a rectangular 15 bit PN-sequence. The result of the correlation by the photonic mixing element is the averaged drift currents $\bar{i}_a$ and $\bar{i}_b$ shown in FIG. 5b in relation to the relative delay $\tau$.

In the case of the quadruple pixel described hereinafter, as shown in FIGS. 8, 9 and 14, the push-pull modulation photogate voltages which are applied to the modulation photogates $G_{cm}$ and $G_{dm}$ and which are superimposed on the bias voltage $U_0$ are preferably delayed by $T_B$ with respect to the push-pull modulation photogate voltages applied to the modulation photogates $G_a$ and $G_b$, that is to say $U_{cm}(t)=U_0+$ $U_m(t-T_B)$ and $U_{dm}(t)=U_0-U_m(t-T_B)$, which results in highly advantageous amplitude and transit time measurements.

Except for a predeterminable delay $T_D$ in respect of the modulation voltages the light intensity const.*$P_{opt}(t)$ irradiated by the transmitter 4 involves the same PN-signal structure. The reflection reaches the photonic mixing element after the echo transit time. The correlation with the push-pull modulation voltages results, in accordance with the respective relative transit time delay $\tau$ for $T_D$=0 in the ideal case without background brightness, in the case of the dual pixel in the mean pixel currents $\bar{i}_a$ and $\bar{i}_b$ shown in FIG. 5b and in the case of the quadruple pixel with the stated $T_B$-time shift additionally in the mean pixel currents $\bar{i}_c$ and $\bar{i}_d$. That correlation characteristic firstly reveals that a plurality of object reflections can be distinguished on the same radius vector, for example for distinguishing a plurality of partially transparent objects which are disposed one behind the other or for the purposes of eliminating multiple reflections.

In addition, the sum and difference of the mean drift current differences, as shown in FIG. 5c are preferably formed in succession in the case of the dual pixel and simultaneously in the case of the quadruple pixel in the respectively corresponding electronic pixel reading-out and signal pre-processing system 15. They permit highly sensitive measurements as it is only in the $T_B$ to $2T_B$-wide measurement window that signal values that are not equal to zero appear. Evaluation of the sum makes it possible to determine the relevance of a measurement on the basis of a minimum amplitude. The difference shows a steep linear configuration in the useable $T_B$-wide measurement window, which permits the transit time to be determined with a high degree of resolution. The following applies for the example which is idealised here:

$$\tau = T_D + \frac{T_B}{2} - \left[\frac{\Delta\bar{i}_{ab} - \Delta\bar{i}_{cd}}{\Delta\bar{i}_{ab} + \Delta\bar{i}_{cd}}\right] * \frac{T_B}{2} \quad (9)$$

The block diagram of a corresponding measuring apparatus for the optical measurement of 3D-objects with PN-modulation based on the proposed correlation photodetector array is characterised by a structure of particular simplicity, as can be seen from FIG. 12. In that case, besides the generator 10 and the delay member 11, the same structure as that shown in FIG. 11 is involved.

In accordance with the invention, for the purposes of rapidly ascertaining distance with a relatively low level of resolution, use is also made of simple rectangular modulation of the transmitter 4 by the generator 10 with the period T and preferably the same pulse and space duration $T_B$. The operation of ascertaining transit time is implemented in accordance with equation (9). The level of resolution is increased stepwise by the period duration T which decreases with the factor 2, in which case the first measurement step is firstly followed by a second involving the same period but with a time shift $T_D$=T/4.

The cross-section illustrated by way of example in FIG. 1 of the pixel 1 of the photonic mixing element according to the invention can be optimised in respect of its limit frequency by a suitable configuration in terms of the potential gradient caused by the push-pull modulation voltage. In that respect, FIG. 6 shows an embodiment by way of example in which a middle gate $G_0$ is arranged between the modulation photogates $G_{am}$ and $G_{bm}$, the middle gate preferably being at the bias voltage $U_0$ and together with the modulation photogates $G_{am}$ and $G_{bm}$ forming three potential stages. What is desired is a potential gradient which is as uniform as possible or a modulation drift field which is as constant as possible, and that is achieved by increasing the number of stages from two to three or even more. In the photosensitive space charge zone the degree of definition or pronouncement of the stages decreases in any case with the spacing from the insulating layer 3. That effect is used in a further embodiment in accordance with the invention, more specifically by using what is known as a "buried channel", a weakly doped n-channel which is some µm away from the insulating layer and which is somewhat deeper in the p-substrate under the modulation photogates. The arrangement also includes a shading 12 for the accumulation gates $G_a$ and $G_b$ so that they are not lit by the light wave and additional charge carriers produced.

FIG. 7 shows a particular configuration and connection of photonic mixing elements in which, in comparison with that in FIG. 1, the two modulation photogates are respectively only separated by a common accumulation gate $G_{s,n}$, thereby achieving a higher degree of filling action. This arrangement also has a shading 12 for the accumulation gates $G_a$ and $G_b$. In this case the polarity of the push-pull modulation voltages or the sequence of $G_{am,n}$ and $G_{bm,n}$ changes from pixel to pixel. That triple period of the gates is suitable at the same time for direct reading-out by virtue of operation as a three-phase shift register. A disadvantage which can be tolerated in certain applications lies in the charge distribution also to the respectively adjacent pixels, which results in an apparent pixel size increase and a lower degree of positional resolution in the direction in question.

Calculation of those interrelationships and influences shows that, in comparison with a 100% useful charge, upon evaluation of the charge differences, the central pixel considered acquires only 50% and the two adjoining pixels each acquire 25%.

To illustrate the charge distribution, FIG. 7, similarly to FIG. 1, shows the various phases of potential distribution for CW-modulation.

FIG. 8 shows a further advantageous embodiment of the design of a pixel of a photonic mixing element which in the case of CW-modulation does not require any IQ (in-phase, quadrature-phase)-switching-over between the I- and Q-states. Instead of the above-described dual pixel, the proposal is for a quadruple pixel with the modulation photogates $G_{am}$, $G_{bm}$, $G_{cm}$ and $G_{dm}$ as well as the associated accumulation gates $G_a$, $G_b$, $G_c$ and $G_d$, which permits correlation simultaneously for four phase positions, as the push-pull modulation photogate voltages $U_{am}(t)$ and $U_{bm}(t)$, $U_{cm}(t)$ and $U_{dm}(t)$ respectively are shifted relative to each other, in particular in the case of HF-modulation through 90°.

Therefore, in an orthogonal arrangement with respect to the described modulation photogates $G_{am}$ with $\phi_{am}$=0° and $G_{bm}$ with $\phi_{bm}$=180°, there are two further modulation photogates $G_{cm}$ with $\phi_{cm}$=90° and $G_{dm}$ with $\phi_{dm}$=270° which are symmetrically integrated within the pixel and which operate on the basis of the same principle. That affords a four-phase charge accumulation with the individual charges $q_a$, $q_b$, $q_c$ and $q_d$ under the associated accumulation gates $G_a$, $G_b$, $G_c$ and $G_d$ or in the associated electronic reading-out system, wherein by means of a simple arithmetical operation the associated phase $\phi_{opt}$ is directly computed as follows:

$$\varphi_{opt} = \arctan \frac{q_c - q_d}{q_a - q_b} \quad (10)$$

For simply determining grey values of an individual pixel, the individual charges of all accumulation gates of a pixel are summed: $q_{Pixel}=q_a+q_b+q_c+q_d$. The reading-out process in respect of the respective four charges is desirably implemented in this case by an active pixel design using CMOS-technology with pixel-wise integrated signal pre-processing.

FIG. 9, like FIG. 8, shows a quadruple pixel of a photonic mixing element, but with a potential gradient which is smoothed as shown in FIG. 6, by means of the central square middle gate $G_0$ which is preferably at the potential $U_0$.

FIG. 14, like FIG. 9, shows a quadruple pixel of a photonic mixing element with a structure which is optimised for digital modulation signals. The middle gate $G_0$, arranged between the preferably square modulation photogates, serves in a similar manner to FIG. 9 for smoothing the potential gradient produced by the modulation photogate voltage.

Finally FIG. 13 shows a further preferred embodiment of a pixel 1 which, in contrast to the above-discussed embodiments, is implemented not using CCD-technology but CMOS-technology with electronic pixel-wise reading-out and signal pre-processing system 15. In this case, the mode of operation of the modulation voltage-dependent drift of the charge carriers on the charge swing is the same as in the above-discussed embodiments. The only difference in the embodiment shown in FIG. 13 is the manner of implementing further processing in respect of the charges $q_a$ and $q_b$ which have drifted to the accumulation gates $G_a$ and $G_b$.

In the present embodiment the accumulation gates $G_a$ and $G_b$ are in the form of blocked pn-diodes. The positively biased accumulation gates $G_a$ and $G_b$ are formed by $n_+$-doped electrodes on a preferably weakly doped p-Si-substrate 3 in FIG. 13. In what is known as the "floating-diffusion" mode of operation or in the high-resistance voltage read-out mode, as in the case of using CCD-technology, the charges $q_a$ and $q_b$ are integrated on the capacitances of the accumulation gates $G_a$ and $G_b$ and are read out in a high-resistance mode in the form of voltage values.

It is advantageously also possible to use a current read-out mode in which the photogenerated charge carriers are not integrated in the potential well but are continuously passed by way of output diffusion by way of suitable current read-out circuits which are connected to the accumulation gates $G_a$ and $G_b$ respectively. Those charges are then integrated for example on a respective external capacitance.

A reading-out circuit in the current read-out mode which keeps the accumulation gate voltage virtually constant by virtue of amplifier feedback advantageously ensures that, upon intensive irradiation of the pixel, the quantity of the accumulated charges $q_a$ and $q_b$ does not result in a reaction on or indeed overflowing of the potential well. The dynamics of the photonic mixing element is thereby considerably improved. In this case also the above-specified technology involving a weakly doped n-channel ("buried layer") under the insulating layer of the modulation gates affords improvements, inter alia an increase in the limit frequency.

Constructing the photonic mixing element using CMOS-technology further permits the use of an active pixel design (APS) with which, at each pixel, a read-out and signal pre-processing circuit can be integrated into the photonic mixing element. That permits pre-processing of the electrical signals directly at the pixel before the signals are passed to an external circuit. In particular it is possible in that way to calculate the phase and amplitude information directly on the chip so that the measurement rate can be further enhanced.

A further configuration of the invention provides for using a preferably two-dimensional photonic mixing element array for a three-dimensional electronic object search and tracking procedure of passively or actively illuminating objects on the basis of various criteria, such as for example object shape, position, colour, polarisation, speed vector, brightness or a combination of object properties. If for example in the passage of various modulation signals (for example frequency or code alteration) in the 3D-measurement of an incident light wave which can initially be unknown, a local correlation is found by the criterion of difference drift currents not equal to zero, then that object range can thereafter be continuously measured specifically in respect of said object properties and tracked, possibly in the event of changes, by way of a regulating loop which in particular also includes image depth.

The photonic mixing element is used in various modes of operation which are set forth hereinafter.

In this respect the sum charge at the accumulation gates $G_a$ and $G_b$ is of less interest as it always corresponds to the total intensity of the incident light waves, $q_a+q_b=\text{const.}*P_{opt,ges}*T$ with T=integration time.

The difference charge $\Delta q_{ab}=q_a-q_b=\bar{i}_a \cdot T - \bar{i}_b \cdot T$ depends on a plurality of factors and can be used in many ways for measuring the incident light wave. For that purpose, consideration is given to a basic brightness which is always present $P_0 \geq P_m$ (see FIG. 3a).

Optionally for example when measuring an object 6 which is lit by a transmitter 4 with modulated light the transmitter power is switched on or off and thus $P_m$ becomes finite or equal to zero. At the same time optionally the modulation voltage $U_m(t)$ either becomes zero or it is switched to the configuration used in the transmitter and contained in the incident light, or to a voltage $U_{m0}$ which is constant during the integration time.

Accordingly, with $P_0 \neq 0$ that gives four important modes of operation:

1.) $\Delta q_{ab}=0$ for $P_m=0$ and $U_m=0$.

2.) $\Delta q_{ab}=0$ with finite $P_m$ and with $U_m(t)$ as an HF-modulation signal.

3.) With finite $P_m$ and a high-frequency modulation voltage $\Delta q_{ab}$ is a function of $U_m(t)$, the relative transit time shift $\tau$ and the incident light power component $P_m(t)$ which is modulated in that way.

4.) If during the integration time T there is an incident mean light intensity $P_0$ and a constant modulation voltage $U_{m0}$, then the difference charge $\Delta q_{ab}$ is a function of $U_{m0}$ and the mean light power $P_0$.

In the case of light waves which are not intensity-modulated, a further configuration of the invention provides that the photonic mixing element is used in accordance with the fourth case of a possible mode of operation, for example for 2D-image processing.

In that case each mixing element is actuable specifically and independently of each other, for example by pixel-wise association of a respective rapidly over-writable modulation voltage word for $U_{m0}$ preferably by means of a RAM-component. Preferably evaluation is effected only in respect of the difference charges $\tau \cdot \Delta \bar{i}_{ab}$ and difference drift currents $\Delta \bar{i}_{ab}$ which are approximately proportional to $U_{m0}$. In that case the modulation voltage $U_{m0}$ is respectively derived from the modulation voltage word.

That means that $U_m(t)$ is no longer set periodically or quasi-periodically as in the preceding examples of use but aperiodically, for example in accordance with a predetermined image content or in accordance with the measured image content. For $U_m(t)=0$ all difference currents are zero so that the associated difference image $D(x,y)$ also appears with the amplitude or intensity zero.

Difference image brightness can thus be specifically influenced by a variation in $U_m(x,y,t)$. In that way in accordance with the invention any light waves or images, that is to say even unmodulated ones, can be subjected to versatile image processing by way of an extremely rapidly settable weighting function $G(x,y,t)=k_1*U_m(x,y,t)$, for example by way of the above-mentioned controllable, pixel-wise associated memory cells, such as for example the above-mentioned uses for object search and tracking, but in that case without the aspect of depth information.

The invention claimed is:

1. A method of determining the phase and/or amplitude information of an electromagnetic wave in which an electromagnetic wave is radiated onto the surface of a photonic mixing element having at least one pixel, wherein the pixel has at least two light-sensitive modulation photogates $G_{am}$ and $G_{bm}$ and associated accumulation gates $G_a$ and $G_b$, in which there are applied to the modulation photogates $G_{am}$ and $G_{bm}$ modulation photogate voltages $U_{am}(t)$ and $U_{bm}(t)$ which are in the form of $U_{am}(t)=U_o+U_m(t)$ and $U_{bm}(t)=U_o-U_m(t)$, wherein $U_o$ represents a bias voltage of the accumulation gates $G_a$ and $G_b$, wherein applied to the accumulation gates $G_a$ and $G_b$ is a dc voltage whose magnitude is at least as great as the magnitude of the sum of $U_o$ and the amplitude of the modulation voltage $U_m(t)$, in which charge carriers produced in a space charge zone of the modulation photogates $G_{am}$ and $G_{bm}$ by the electromagnetic wave are exposed to a potential gradient of a drift field in dependence on the polarity of the modulation photogate voltages $U_{am}(t)$ and $U_{bm}(t)$ and drift to the corresponding accumulation gate $G_a$ and $G_b$, in which charges $q_a$ and $q_b$ which have drifted to the respective accumulation gates $G_a$ and $G_b$ are taken off, and wherein the phase and amplitude information is directly computed in an electronic pixel reading-out and signal pre-processing system which is integrated on a chip containing said photonic mixing element.

2. The method according to claim 1, characterized in that pixel phase is ascertained directly by an active pixel sensor structure (APS), wherein the pixel phase is then read out by way of a multiplex structure disposed on the chip.

3. The method according to claim 2, wherein the pixel phase is read out selectively by way of said multiplex structure.

4. The method according to claim 2, wherein the pixel phase is read out serially by way of said multiplex structure.

5. The method according to claim 1, characterized in that pixel transit time and pixel brightness are ascertained directly by an active pixel sensor structure (APS), wherein said pixel transit time and pixel brightness are then read out by way of a multiplex structure disposed on the chip.

6. The method according to claim 5, wherein the pixel transit time and the pixel brightness are read out selectively by way of said multiplex structure.

7. The method according to claim 5, wherein the pixel transit time and the pixel brightness are read out serially by way of said multiplex structure.

8. A method of determining the phase and/or amplitude information of an electromagnetic wave in which an electromagnetic wave is radiated onto the surface of a photonic mixing element having a plurality of pixels, wherein each of the pixels has at least two light-sensitive modulation photogates $G_{am}$ and $G_{bm}$ and associated accumulation gates $G_a$ and $G_b$, in which there are applied to the modulation photogates $G_{am}$ and $G_{bm}$ modulation photogate voltages $U_{am}(t)$ and $U_{bm}(t)$ which are in the form of $U_{am}(t)=U_o+U_m(t)$ and $U_{bm}(t)=U_o-U_m(t)$, wherein $U_o$ represents a bias voltage of the accumulation gates $G_a$ and $G_b$, wherein applied to the accumulation gates $G_a$ and $G_b$ is a dc voltage whose magnitude is at least as great as the magnitude of the sum of $U_o$ and the amplitude of the modulation voltage $U_m(t)$, in which charge carriers produced in a space charge zone of the modulation photogates $G_{am}$ and $G_{bm}$ by the electromagnetic wave are exposed to a potential gradient of a drift field in dependence on the polarity of the modulation photogate voltages $U_{am}(t)$ and $U_{bm}(t)$ and drift to the corresponding accumulation gate $G_a$ and $G_b$, in which charges $q_a$ and $q_b$ which have drifted to the respective accumulation gates $G_a$ and $G_b$ are taken off, wherein a plurality of the pixels are arranged as a 3D-line or matrix camera, which is combined with a conventional 2D-camera, and wherein spectral allocation and feed of an active modulated illumination component to the 3D-camera and of other unmodulated illumination components is effected by a beam splitter.

9. The method according to claim 8, wherein at least three separate ones of the photonic mixing element are provided in a spaced relationship in order to determine an exact position of an object from which electromagnetic waves are received by said at least three photonic mixing elements, in a manner according to a global positioning system (GPS).

10. A photonic mixing element with at least one pixel (1), which has at least two light-sensitive modulation photogates ($G_{am}$, $G_{bm}$) comprising terminals for and adapted to receive modulation photogate voltages $U_{am}(t)$ and $U_{bm}(t)$ which are in the form of $U_{am}(t)=U_o+U_m(t)$ and $U_{bm}(t)=U_o-U_m(t)$, accumulation gates ($G_a$, $G_b$) which are associated with the modulation photogates ($G_{am}$, $G_{bm}$) and which are shaded relative to an incident electromagnetic wave, wherein $U_o$ represents a bias voltage of the accumulation gates ($G_a$, $G_b$) and $U_m(t)$ represents modulation voltage, and wherein an electronic pixel reading-out and signal pre-processing system is associated with a chip containing said pixel.

11. The photonic mixing element according to claim 10, characterized in that the electronic pixel reading-out and signal pre-processing system is provided as an active pixel sensor (APS) structure, wherein a multiplex structure is disposed on the chip.

12. The photonic mixing element according to claim 11, wherein said multiplex structure selectively reads out the active pixel sensor (APS) structure.

13. The photonic mixing element according to claim 11, wherein said multiplex structure serially reads out the active pixel sensor (APS) structure.

14. A 3D-camera comprising an apparatus for determining phase information of an electromagnetic wave, the apparatus having at least one photonic mixing element comprising:

at least one pixel (1), which has at least two light-sensitive modulation photogates ($G_{am}$, $G_{bm}$) comprising terminals for and adapted to receive modulation photogate voltages $U_{am}(t)$ and $U_{bm}(t)$ which are in the form of $U_{am}(t) = U_o + U_m(t)$ and $U_{bm}(t) = U_o - U_m(t)$, accumulation gates ($G_a$, $G_b$) which are associated with the modulation photogates ($G_{am}$, $G_{bm}$) and which are shaded relative to an incident electromagnetic wave, wherein $U_o$ represents a bias voltage of the accumulation gates $G_a$ and $G_b$, and having a modulation generator (10, 13), and having a transmitter (4) that irradiates the electromagnetic wave which is intensity-modulated by the modulation generator (10, 13) in predetermined manner, wherein the electromagnetic wave which is reflected by an object (6) is radiated onto the surface of the photonic mixing element, and wherein the modulation generator (10, 13) supplies the photonic mixing element with modulation voltages $U_m(t)$ which are in a predetermined phase relationship with respect to the phase of the electromagnetic wave that is irradiated from the transmitter.

15. The 3D-camera according to claim 14, wherein the 3D-camera is combined with a 2D-camera, the 2D-camera arranged to receive electromagnetic waves from the object (6) at about the same direction which the 3D-camera receives said electromagnetic wave which is reflected by the object (6), wherein a beam splitter is provided in order to feed an active modulated illumination component to the 3D-camera and a remaining unmodulated illumination component to the 2D-camera.

16. A method of determining the phase and/or amplitude information of an electromagnetic wave in which an electromagnetic wave is radiated onto the surface of a photonic mixing element having at least one pixel, wherein the pixel has at least two light-sensitive modulation photogates $G_{am}$ and $G_{bm}$ and associated accumulation gates $G_a$ and $G_b$, in which there are applied to the modulation photogates $G_{am}$ and $G_{bm}$ modulation photogate voltages $U_{am}(t)$ and $U_{bm}(t)$ which are in the form of $U_{am}(t) = U_o + U_m(t)$ and $U_{bm}(t) = U_o - U_m(t)$, wherein $U_o$ represents a bias voltage of the accumulation gates $G_a$ and $G_b$, wherein applied to the accumulation gates $G_a$ and $G_b$ is a dc voltage whose magnitude is at least as great as the magnitude of the sum of $U_o$ and the amplitude of the modulation voltage $U_m(t)$, in which charge carriers produced in a space charge zone of the modulation photogates $G_{am}$ and $G_{bm}$ by the electromagnetic wave are exposed to a potential gradient of a drift field in dependence on the polarity of the modulation photogate voltages $U_{am}(t)$ and $U_{bm}(t)$ and drift to the corresponding accumulation gate $G_a$ and $G_b$, in which charges $q_a$ and $q_b$ which have drifted to the respective accumulation gates $G_a$ and $G_b$ are taken off, and wherein illumination of a scene is provided with modulated light from different spectral regions in order to obtain different color components of a resulting image for reconstructing a complete color image together with spatial depth information.

* * * * *